US007298359B2

(12) United States Patent
Kim et al.

(10) Patent No.: US 7,298,359 B2
(45) Date of Patent: *Nov. 20, 2007

(54) NOTEBOOK COMPUTER WITH DETACHABLE INFRARED MULTI-MODE INPUT DEVICE

(75) Inventors: Darren Kim, Oakland, CA (US); Takeshi Hamano, Zama (JP); Nobuyuke Koike, Fremont, CA (US); Ashok Vasudeo, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/894,568

(22) Filed: Jun. 27, 2001

(65) Prior Publication Data

US 2001/0033267 A1  Oct. 25, 2001

Related U.S. Application Data

(63) Continuation of application No. 09/145,817, filed on Sep. 2, 1998, now Pat. No. 6,424,335.

(51) Int. Cl.
*G09G 5/08* (2006.01)
(52) U.S. Cl. .................. 345/158; 345/166; 345/169
(58) Field of Classification Search ............... 345/156, 345/158, 161, 163, 164, 165, 166, 167, 168, 345/169; 361/683, 686
See application file for complete search history.

(56) References Cited

U.S. PATENT DOCUMENTS

| 5,049,863 | A | 9/1991 | Oka |
| 5,063,289 | A | 11/1991 | Jasinski et al. |
| 5,126,955 | A | 6/1992 | Tomoda |
| 5,231,381 | A | 7/1993 | Duwaer |
| 5,307,297 | A | 4/1994 | Iguchi et al. |
| 5,327,161 | A | 7/1994 | Logan et al. |
| 5,416,909 | A * | 5/1995 | Long et al. .................. 710/36 |
| 5,428,368 | A | 6/1995 | Grant |
| 5,457,479 | A | 10/1995 | Cheng |
| 5,459,489 | A | 10/1995 | Redford |
| 5,481,265 | A | 1/1996 | Russell |
| 5,490,039 | A | 2/1996 | Helms |
| 5,546,334 | A | 8/1996 | Hsieh et al. |
| 5,563,630 | A | 10/1996 | Tsakiris et al. |
| 5,572,033 | A | 11/1996 | Grant |
| 5,574,479 | A * | 11/1996 | Odell .......................... 345/158 |
| 5,576,733 | A | 11/1996 | Lo |
| 5,631,669 | A * | 5/1997 | Stobbs et al. ................ 345/163 |
| 5,648,798 | A | 7/1997 | Hamling |
| 5,659,335 | A | 8/1997 | Partridge, III |
| 5,669,004 | A | 9/1997 | Sellers |
| 5,669,015 | A | 9/1997 | Chidester et al. |

(Continued)

FOREIGN PATENT DOCUMENTS

EP    0 538 794 A1    4/1991

(Continued)

*Primary Examiner*—Kent Chang
(74) *Attorney, Agent, or Firm*—Baker Botts L.L.P.

(57) ABSTRACT

A notebook computer comprises a plurality of conventional sensors disposed on the notebook computer to achieve a wide-angle infrared sensor response. An infrared input device comprises a mouse and a touchpad with an improved energy management system to reduce power consumption and a user settable identification code to prevent crosstalk with other infrared devices.

2 Claims, 21 Drawing Sheets

U.S. PATENT DOCUMENTS

| | | | |
|---|---|---|---|
| 5,707,160 A | 1/1998 | Bowen | |
| 5,726,684 A | 3/1998 | Blankenship et al. | |
| 5,731,801 A * | 3/1998 | Fukuzaki | 715/842 |
| 5,754,126 A | 5/1998 | Hilbrink et al. | |
| 5,764,224 A | 6/1998 | Lilja et al. | |
| 5,771,038 A * | 6/1998 | Wang | 345/163 |
| 5,781,177 A | 7/1998 | Helot et al. | |
| 5,781,405 A | 7/1998 | Vossler | |
| 5,790,100 A | 8/1998 | Kikinis | |
| 5,854,621 A * | 12/1998 | Junod et al. | 345/158 |
| 5,914,703 A * | 6/1999 | Herng-Chuen | 345/157 |
| 5,943,625 A * | 8/1999 | Yeom et al. | 455/557 |
| 5,952,996 A * | 9/1999 | Kim et al. | 345/158 |
| 6,107,992 A * | 8/2000 | Ishigaki | 345/158 |
| 6,111,563 A * | 8/2000 | Hines | 345/166 |
| 6,163,326 A * | 12/2000 | Klein et al. | 345/163 |
| 6,205,021 B1* | 3/2001 | Klein et al. | 361/683 |
| 6,344,846 B1* | 2/2002 | Hines | 345/166 |
| 6,424,335 B1* | 7/2002 | Kim et al. | 345/158 |
| 6,674,424 B1* | 1/2004 | Fujioka | 345/157 |

FOREIGN PATENT DOCUMENTS

| | | |
|---|---|---|
| EP | 06119113 | 4/1994 |
| EP | 712066 | 5/1996 |
| EP | 0 785 497 A1 | 7/1997 |
| GB | 2 312 040 A | 10/1997 |
| JP | 62-169842 | 10/1987 |
| JP | 63-72640 | 5/1988 |
| JP | 1-178638 | 12/1989 |
| JP | 2-58838 | 4/1990 |
| JP | 2-210522 | 8/1990 |
| JP | 3-63810 | 3/1991 |
| JP | 4-152417 | 5/1992 |
| JP | 5-11922 | 1/1993 |
| JP | 2-210523 | 8/1993 |
| JP | 5-197491 | 8/1993 |
| JP | 6-19582 | 1/1994 |
| JP | 6-119113 | 4/1994 |
| JP | 7-261928 | 10/1995 |
| JP | 8-211998 | 8/1996 |
| JP | 9-69026 | 3/1997 |
| JP | 9-297630 | 11/1997 |
| JP | 10-187347 | 7/1998 |
| JP | 10-198512 | 7/1998 |
| WO | 95/08813 | 3/1995 |

* cited by examiner

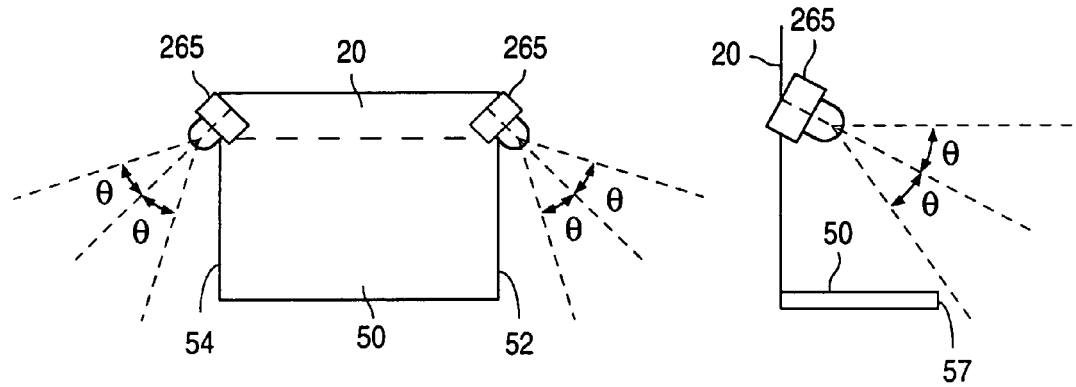
FIG. 12A  FIG. 12B
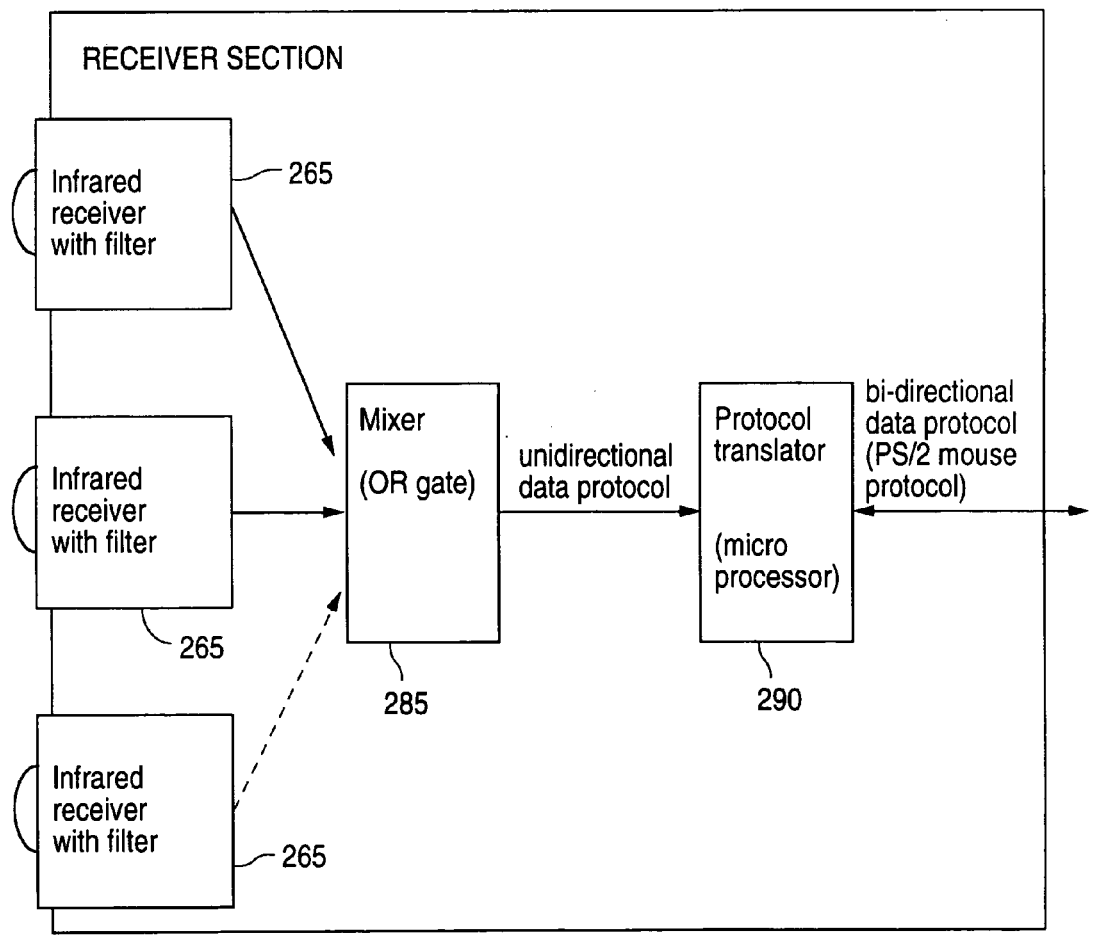
FIG. 13

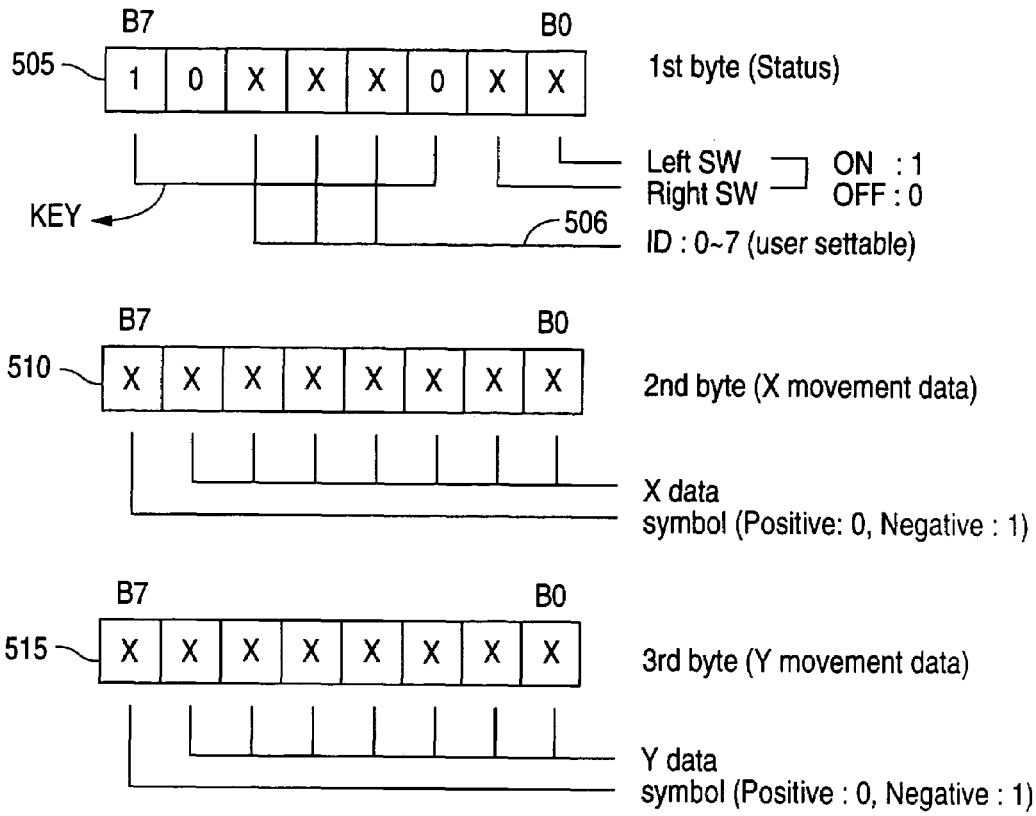
FIG. 17
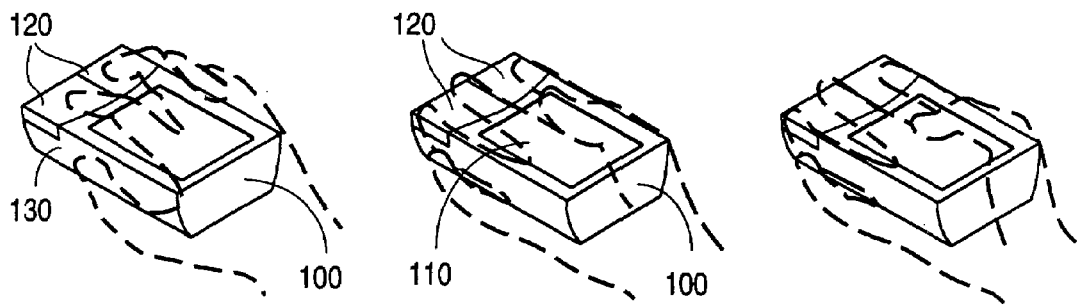
FIG. 18  FIG. 19  FIG. 20

NOTEBOOK COMPUTER WITH DETACHABLE INFRARED MULTI-MODE INPUT DEVICE

CROSS REFERENCE TO RELATED APPLICATIONS

This application is a continuation of U.S. patent application Ser. No. 09/145,817, filed Sep. 2, 1998 now U.S. Pat. No. 6,424,335.

FIELD OF THE INVENTION

This invention is generally related to the field of computer input devices, and more particularly to input devices for use in laptop and notebook computers.

BACKGROUND OF THE INVENTION

Compact, portable computers are becoming increasingly popular among college students, businesspeople, writers, and others who require portable word-processing, e-mail, and computer graphics capabilities. In particular, notebook-sized computers, commonly known as "notebook computers", are becoming increasingly popular because their small size and small weight make them portable and convenient to use.

It is desirable to make the notebook computer easy to use, particularly in a variety of locations. For example, many businesspeople use their notebook computer while traveling. Consequently, it is desirable that the notebook computer fit onto a small space, such as an airline seat-tray. Preferably, a notebook computer is also compact enough to be easily carried, such as in a briefcase or a piece of luggage.

Generally, a notebook computer comprises two main sections. The first section is a liquid crystal display (LCD) for displaying information. The second section typically comprises a compact keypad area for entering data.

Notebook computers typically do not use a mouse to perform a cursor scrolling and pointing function. A conventional mouse is comparatively large and has a long cable which must be connected to the computer. This makes it difficult to stow the mouse within the computer without greatly increasing the total size of the notebook computer. Although a separate mouse can be carried by the user and connected to the computer by an external electrical port prior to use, it is inconvenient. Also, since there are typically only a limited number of external electrical ports, attaching an external mouse to a notebook computer limits the number of other peripheral devices which can be attached to the computer. Commonly, notebook computer designers incorporate a touchpad or trackball proximate to the keypad to emulate part of the function of a mouse. The touchpad or trackball performs many of the same scrolling and cursor positioning functions as a conventional computer mouse. However, this is not a satisfactory solution for many applications. For example, while a compact trackball or touchpad emulates some mouse functions, a mouse provides superior control and user comfort for many applications. This is particularly true in graphics applications where the user "clicks" and "drags" line segments to create drawings. A mouse has the advantage that it can be easily moved over a comparatively large area with a high level of control. By way of comparison, a compact trackball or touchpad requires either precise finger motions or slowing the cursor response such that many turns of the trackball or many sweeps across the touchpad are required to change the cursor position across the screen. There are also other problems with notebook computer trackballs and touchpads, particularly if they are used for extended periods. For example, in a constrained location, such as an airline seat, the user may be forced into using the device in a position which is uncomfortable for the user's hand.

Trackballs and touchpads are also an unsatisfactory solution because of the way many businesspeople use their notebook computer. In particular, notebook computers are increasingly being used in sales presentations. High performance notebook computers have excellent graphics capability. Information on product lines and interactive sales presentations can be stored in notebook computers and presented to a group of prospective customers. However, since the best viewing position is directly in front of the computer, the salesperson must position themselves to the side or at a distance from the notebook computer to permit their customers the best view of the screen. Consequently, the salesperson needs to connect an external input device with a long cord if they are to guide the computer presentation. However, the physical size of many external input devices is inconsistent with the goal of a compact, notebook-sized computer which is highly portable (i.e., one that can be easily transported in a salesperson's briefcase). Additionally, separate input devices with long cords have the disadvantage that they can easily become lost, tangled, or damaged during transportation. Moreover, since a notebook computer is extremely light, an input device connected to the notebook computer by a long cable creates the risk that the notebook computer may be accidently dragged to the ground.

One attempted solution to some of these problems is a portable computer design with an internal cavity to house a conventional cable-connected mouse which can be stowed when not in use. For example, U.S. Pat. No. 5,490,039 discloses a portable computer with a mouse designed to be stowed in a cavity in the personal computer. However, the mouse would have to be extremely compact to fit into a notebook computer, which would tend to make it uncomfortable during extended use. Additionally, if the mouse cable was made long enough to facilitate business presentations it could easily tangle or become snagged. Moreover, given the light weight of a notebook computer, a mouse operated from a distance creates the potential for the notebook computer accidentally being dragged by the mouse wire, which may damage the electrical connections or drag the computer off of a table or desk upon which it is placed.

Another attempted solution to some of these problems is a wireless mouse coupled to the computer by electromagnetic means. In particular, the use of an infra-red communications link between a wireless mouse and a computer has been proposed. For example, U.S. Pat. No. 5,726,684 discloses a laptop computer with a detachable mouse-trackball pointing device in which infrared radiation transmission may be used to couple the input device with optical sensors located on the keyboard section of the computer, such as in a cavity in which the pointing device may be stowed when it is not detached from the unit. Similarly, U.S. Pat. 5,049,863 discloses a cursor key unit having a mouse function which may be coupled to the keyboard by optical signals. The cursor key unit pulls out from a cavity in the keyboard section and transmittings optical signals to sensors located in the cavity. However, there are numerous problems with coupling an input device to a notebook computer using infra-red or optical signals. One problem is that common infrared signal sources, such as light-emitting diodes, consume a lot of power. A typical gallium arsenide diode, for example, requires a voltage in excess of 1.5 volts and typically requires a current of one-to-100 milli-amperes to produce a reasonably strong infrared signal. Another problem is that substantial power is needed to a provide a movement sensing function. A wireless mouse incorporating sensors, an infrared source, and control electronics may consume substantial amounts of battery power, particularly if the power of the infrared source is increased such that the mouse can be operated a substantial distance from the optical sensor. Consequently, the battery lifetime of a wireless mouse may be poor, especially if a compact battery is used. A short battery lifetime not only increases the operating cost of the notebook but also increases user frustration. For example, a wireless mouse with a short battery lifetime (e.g., one week) requires a salesperson to bring along extra batteries during a business trip and to proactively change batteries before important presentations.

Another important issue in the design of input devices for notebook computers is ergonomics, which has not been addressed in the context of compact wireless mouse/trackball units. Space and weight are at an extreme premium in a notebook computer. A wireless mouse designed to fit within a cavity in a notebook computer must be extremely compact. However, even small reductions in size of conventional computer input devices may result in the notebook computer being uncomfortable to use. Generally while extensive research has been done on achieving a comfortable hand-grip for conventional mouse designs, the issue of achieving a compact mouse with a comfortable hand grip has not been addressed in the context of wireless mouse designs suitable for notebook computers.

Still another drawback with previously known wireless mouse designs is that they merely replicate the function of a touchpad or trackball integrated into the notebook computer. In particular, conventional wireless mouse designs, such as that of U.S. Pat. Nos. 5,049,863 and 5,726,684, merely permit the user to detach the input device from the keyboard and displace it a short distance in front of the computer. The input device in its detached mode cannot be used to perform functions substantially different from those available in its attached mode. Another reason why previously known wireless mouse designs do not substantially increase the functionality of a computer is that the wireless mouse must be operated within a comparatively short distance of the computer. Since a light emitting diode emits light in a diverging, but predominately line-of-sight mode, the input devices of U.S. Pat. Nos. 5,049,863 and 5,726,684 must be used with the input device disposed substantially pointing towards the sensor located along a portion along the keyboard (i.e., within a keyboard cavity). Thus, the wireless input devices of U.S. Pat. Nos. 5,049,863 and 5,726,684 would not be of much use in locations, such as an airline seat, where the user does not have access to a planar surface directly in front of the keyboard sensor. Also, wireless input devices in which the sensors are configured in a keyboard cavity are completely inconsistent with a salesman using an input device from a distance while a prospective customer sits directly in front of the keyboard, since the customer's body would shield the keyboard sensors from infrared signals. Moreover, the wireless input devices of U.S. Pat. Nos. 5,049,863 and 5,726,684 would require substantial amounts of battery power to be operated at a distance from the keyboard.

Conventional wireless mouse designs provide the limited benefit of permitting the user to operate the input device a short distance directly in front of the keyboard of the computer without an additional cord. However, conventional wireless mouse designs have many limitations, particularly if the unit is reduced in size so that it may be inserted into a cavity in a notebook computer. Consequently, many consumers may decide that the small benefit of a wireless mouse does not justify the additional initial hardware cost, increased maintenance costs (for batteries), and physical discomfort of using a non-ergonomic input device.

What is desired is a new notebook computer and wireless input device design which is energy efficient, consistent with operating the input device an extended distance from the computer, and which increases the functionality available to a user interacting with a notebook computer.

SUMMARY OF THE INVENTION

The present invention generally comprises an inventive infrared input device to realize a mouse-like function and an inventive sensor configuration which permits a notebook computer to inexpensively achieve a wide angle infrared sensor response. Preferably the inventive infrared input device is used in combination with the inventive sensor configuration in order to realize the full benefits of the present invention.

The inventive notebook computer has its infrared sensors oriented on the notebook computer to reduce shadowing. In a preferred embodiment, the signals of two or more sensors are combined to achieve a wide-angle sensor response with a small number of conventional infrared sensors.

In a preferred embodiment, two spaced-apart sensors are disposed on the frame of the liquid crystal display (LCD). A wide-angle sensor response with only two sensors spaced apart along the lower edge of the LCD frame is facilitated by tilting the two sensors with respect to the surface of the LCD to improve sensor response. In a preferred embodiment the sensors are angled down at less than about nine degrees and angled out towards the sides at an angle of less than about thirteen degrees.

Another aspect of the inventive notebook computer is signal arbitration circuitry which permits the notebook computer to interact with an auxiliary infrared input device in a variety of ways. In a preferred embodiment, the notebook computer permits the user to select whether the infrared input device is used alone or in combination with other input devices, such as other input devices fixed to the notebook computer, cable-connected input devices, or other wireless input devices.

The inventive infrared input device comprises a mouse and preferably at least one other input device, such as a touchpad. One aspect of the inventive infrared input device is an improved power management design. The rotary encoders of the mouse are operated in low-power polling mode when the mouse is in a quiescent state. A range switch permits a user to adjust the infrared power commensurate with a particular use. Also, cursor position data is transmitted in pulsed form so that no infrared transmitter power is required in a quiescent state. Another aspect of the inventive infrared input device is a user settable identification code to prevent crosstalk with other infrared devices. Still yet another aspect of the inventive infrared input device is an ergonomic design that facilitates a user comfortably using the input device as both a mouse and as a touchpad.

BRIEF DESCRIPTION OF THE DRAWINGS

FIG. 12A is an illustrative top view showing how angling sensors towards the edges of the computer base improves sensor reception in those areas.

FIG. 12B is an illustrative side view showing how angling sensors down towards the front of the unit improves sensor reception in front of the computer base.

FIG. 13 is an electronic block diagram showing how a plurality of sensor inputs may be combined together.

FIG. 17 shows the preferred three-byte data block for transmitting data.

FIG. 18 is a perspective view of the infrared input module of the present invention held as a mouse.

FIG. 19 is a perspective view of the infrared input module held in the palm as a touch-pad input device for the input device of the present invention.

FIG. 20 is perspective view of the input module held in the palm showing the accessibility of the thumb to the touch-pad surface.

DETAILED DESCRIPTION OF THE INVENTION

The present invention generally comprises an inventive infrared input device to realize a mouse-like function and an inventive sensor configuration which permits a notebook computer to inexpensively achieve a wide angle infrared sensor response. Preferably the inventive infrared input device is used in combination with the inventive sensor configuration in order to realize the full benefits of the present invention.

The present invention also comprises a variety of other features which provide important benefits and which increase the functionality of an infrared input device. An energy efficient power management substantially reduces the quiescent energy requirements for the infrared input device, which improves battery lifetime. Signal arbitration circuits in the notebook computer permit the infrared input device to be used in a variety of new ways with other input devices. The ergonomic design of the infrared input device also permits the unit to be used comfortably with a variety of hand grips, which facilitates using the input device as a mouse, touchpad, or in other ways.

Figure 1:
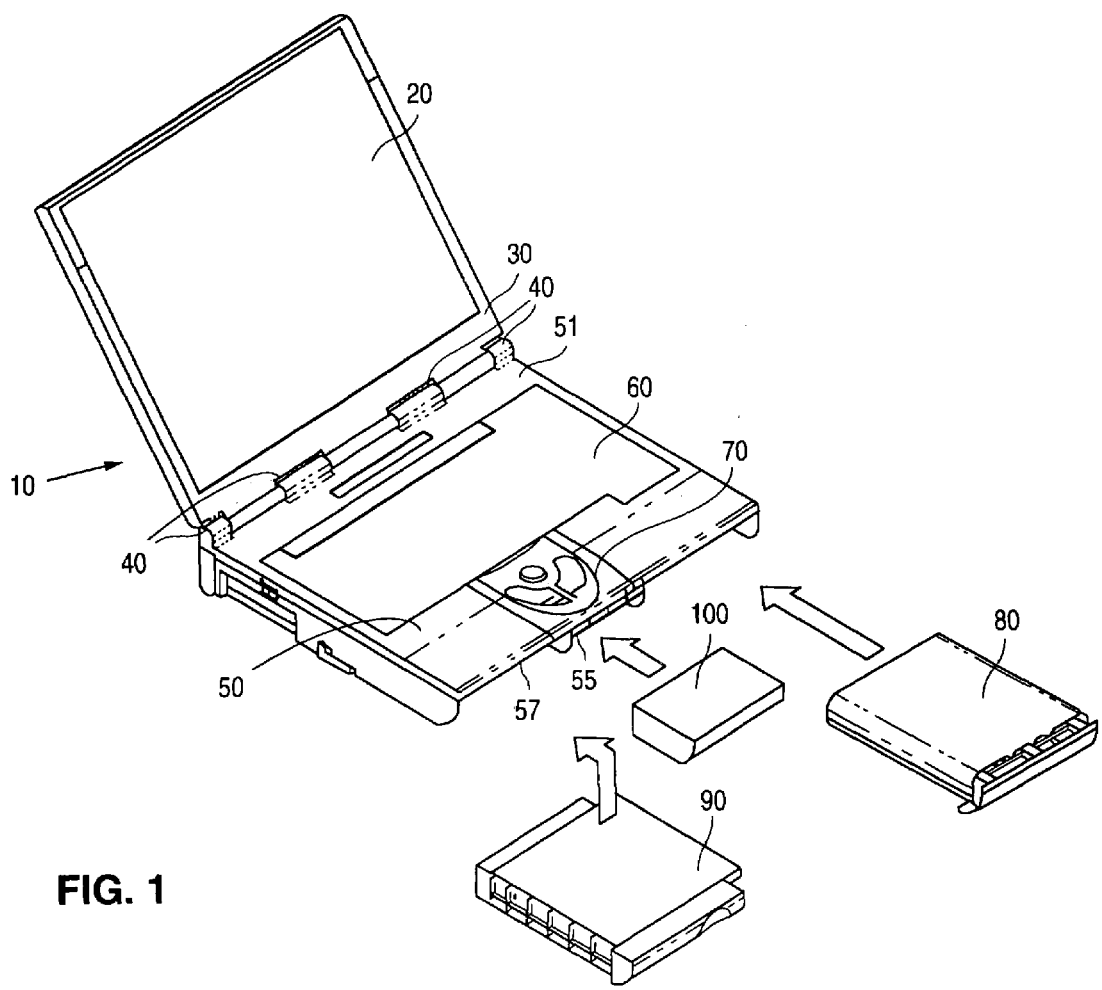
FIG. 1 is a perspective view of the notebook computer of the present invention.

FIG. 1 is a perspective drawing showing a compact notebook computer 10 of the present invention. The notebook computer has a liquid crystal display (LCD) screen 20 disposed on an LCD bezel frame 30 coupled by hinges 40 to a computer base portion 50. As shown in FIG. 1, the LCD bezel frame comprises a substantially rectangular frame for holding a LCD screen 20. The computer base 50 contains a conventional computer keyboard section 60 (not shown in detail) for typing in information. The computer base 50 comprises an outer frame, or housing, 51 which contains the computer electronics.

The computer base 50 also has a pointing device 70 which emulates part of the function of a conventional mouse. The pointing device 70 may comprise a glide point, dome point, or other compact pointing device. The pointing device 70 is attached to the notebook computer. The notebook computer 10 may also have modules 80 and 90 which slide into the base portion 50. These modules may comprise a battery unit or other electronic functions, such as a hard disk drive unit. However the function of modules 80, 90 could also be achieved by including the function of modules 80,90 inside the base 50.

A notebook computer has a comparatively thin computer base portion 50. Typically, the base region 50 is less than about three centimeters thick. A compact detachable infrared input module 100 with a thickness of about 2 centimeters slides into a slot 55 in base region 50, preferably underneath pointing device 70. Compact detachable input module 100 provides mouse-like cursor control inputs to notebook computer 10. The thickness of infrared input module 100 is limited by the thickness of typical notebook computers. As shown in FIG. 1, detachable infrared input module 100 is preferably an auxiliary input device which performs a separate input function from pointing device 70.

There are many benefits to using detachable input module 100 as an auxiliary input device. One benefit is that if input module 100 is used as an auxiliary input device its own miniature batteries (not shown in FIG. 1) last longer than if it was used as the sole input device. Another benefit of an auxiliary input device is that it may be designed as a multi-mode input device which increases the functionality of the computer. For example, an auxiliary input device can have a different cursor control device than the primary pointing device 70.

Another benefit of an auxiliary input device is that it permits the user greater freedom to combine several input devices together to increase the functionality of a notebook computer. For example, with appropriate signal arbitration, a salesperson could input pointing or other data from an infrared input module 100 while a customer used the primary pointing device 70 and/or a conventional wire-connected mouse.

Moreover, an auxiliary infrared input module 100 may be designed to incorporate additional functions, such as a laser pointer. A laser pointer could be used by a salesperson to point out particular objects on a screen or be used by a group of designer to facilitate a discussion regarding critical features of a schematic diagram presented on the computer screen. The auxiliary input device could also perform other control functions besides a cursor control function. For example, the auxiliary input device could have additional control features to input numbers, which may facilitate an electronic sales presentation or be used in other ways, such as permitting a salesperson to remotely dial phone numbers.

Preferably, the computer is programmed to permit inputs from the pointing device 70 and the detachable input module 100 in variety of ways, such as an or-mode (accepting inputs from either device simultaneously) or an exclusive-or-mode (only one input device or the other). An or-mode for example, permits a salesperson and a customer to simultaneously input mouse-information to a notebook computer. Preferably the notebook computer has signal arbitration circuitry which permit a first mode in which the notebook computer locks out signals from auxiliary input devices and at least one other mode in which signal inputs from primary and auxiliary inputs are added together cumulatively to permit several input devices to be simultaneously used.

Figure 2A:
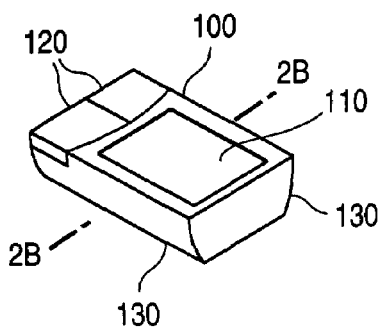
FIG. 2A is a perspective view of the infrared input module of the present invention.

FIG. 2A is a perspective view of a preferred embodiment of the detachable input module 100 which can function as a detachable mouse. The detachable input module 100 also preferably has a touchpad 110 or other device which performs the function of emulating a mouse function based upon a user's finger inputs. This permits the detachable input module 100 to be used to control cursor function even in situations, such as riding in an airplane seat, when it is not possible for the user to use the detachable input module 100 as a mouse. Circuits which may be used to toggle between different input devices, such as mouse/trackball hybrids, are well known in the art.

Figure 2B:
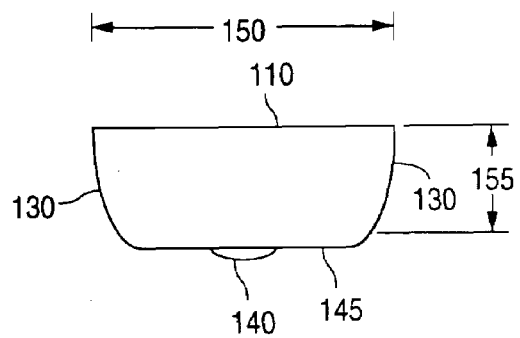
FIG. 2B is a cross-sectional view of the input module of FIG. 2A along line 2B-2B.
Figure 2C:
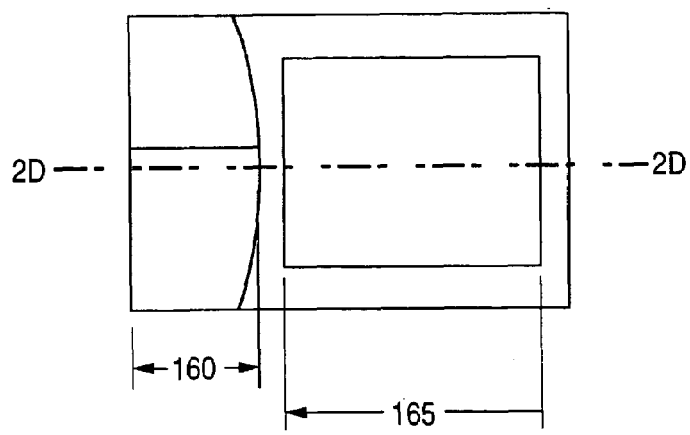
FIG. 2C is a top view of the input module of FIG. 2A.
Figure 2D:
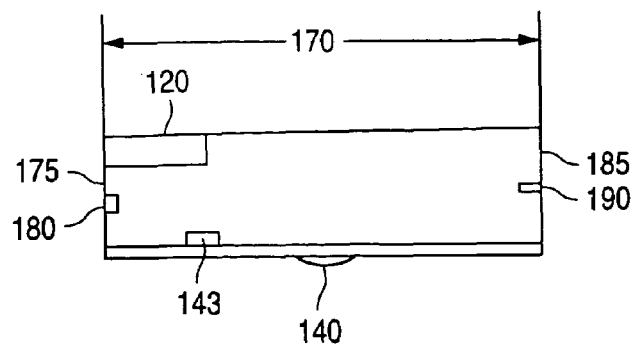
FIG. 2D is a cross-sectional view of the input module of FIG. 2C along line 2D-2D.

The detachable input module 100 also preferably has mouse buttons 120 which perform a comparable function to that of conventional mouse buttons used to perform a "clicking" function. The detachable input module 100 preferably also has two flared sides 130. The flare is preferably selected to match the bevel angle of the front edge 57 of the base portion 50. This facilitates a conformal fit of the detachable input module 100 when it is stowed in slot 55. However, preferably both sides are flared to facilitate a comfortable grip. FIG. 2B is a cross sectional view of the detachable input module 100 along the line 2B-2B of FIG. 2A. The bottom side 145 of the detachable input unit 100 has a compact mouse-ball 140 which is about sixteen millimeters in diameter. The maximum width 150 of the detachable input unit 100 is between four-to-six centimeters and preferably about five centimeters. The maximum thickness 155 is less than three centimeters and preferably about two centimeters. FIG. 2C is a top view of detachable input unit 100. The mouse buttons 120 preferably have a length 160 of about two centimeters. The touchpad 110 preferably has a length 165 of about four centimeters. FIG. 2D is a cross sectional view of the detachable input unit 100 along the line 2D-2D of FIG. 2C. The detachable input unit has a length 170 between six-to-eight centimeters and preferably about seven centimeters. Along a first edge 175 proximate to mouse buttons 120 is disposed an infra-red transmitter 180. Additional miniature control switches 190 are disposed along the surface of the detachable input unit 100, such as along a second edge 185. An identification code switch 143 may also be disposed on a portion of the unit, such as in recessed portion near the mouse ball 140.

Infrared transmitter 180 permits the detachable input unit 100 to communicate data signals to infrared sensors/receivers (not shown in FIG. 1) disposed on the notebook computer 10. The general principles of infrared transmitters and sensors are well known. Also the general principles to encode data into a digital pulse format suitable for infrared transmission and detection are well known. Typical infrared emitters, such as light emitting diodes (LEDs), emit light in a relatively narrow diverging cone corresponding to an elliptical beam with a beam divergence of about thirty degrees in one direction and sixty degrees in another direction. Some variation in beam divergence may be achieved using different LEDs and/or lenses configurations. However, LEDs typically produce a beam with a comparatively narrow beam divergence.

One aspect of the present invention is a notebook computer sensor design which permits a notebook computer to function as a wide angle infrared sensor using a minimal number of comparatively inexpensive infrared sensors. Conventional wireless mouse designs commonly utilize a single infrared sensor located on the front or side edge of the keyboard to detect infrared radiation from an infrared mouse. This is the most efficient sensing region for a mouse rolled upon a surface proximate to the front or side of the keyboard, since the LED beam directly faces the sensor. However, the inventors have recognized that this approach limits the potential use of a detachable mouse to a surface immediately proximate to the keyboard sensor.

A detached infrared input module 100 communicating with a sensor disposed on a portion of a notebook computer can be modeled as a free space infrared communications link with shadowing effects at the receiver sensor. The methods to calculate the power density from an infrared source traveling in free space as a function of distance and angle from the infrared source are well known. To first order, the power density of a diverging LED beam traveling in free space will decrease inversely with the square of the distance from the source. Also, common infrared sensors used to detect pulse modulated infrared signals have an inherent angular response related by principles of geometrical optics regarding how large a fraction of the input beam is coupled to the semiconductor material comprising the sensor. Typically, the strongest response is for infrared light impinging substantially normal to the surface of the detector and decreasing very rapidly beyond some angular range. For example, the Toshiba Photo IC Model TPS831, which contains a photodiode, I-V converter, bandpass filter, and other control electronics to detect pulse-position modulated signals, has a strong angular dependence for light impinging at angles about sixty degrees from the horizontal and about thirty degrees from the vertical relative to the surface of the IC.

Figure 3:
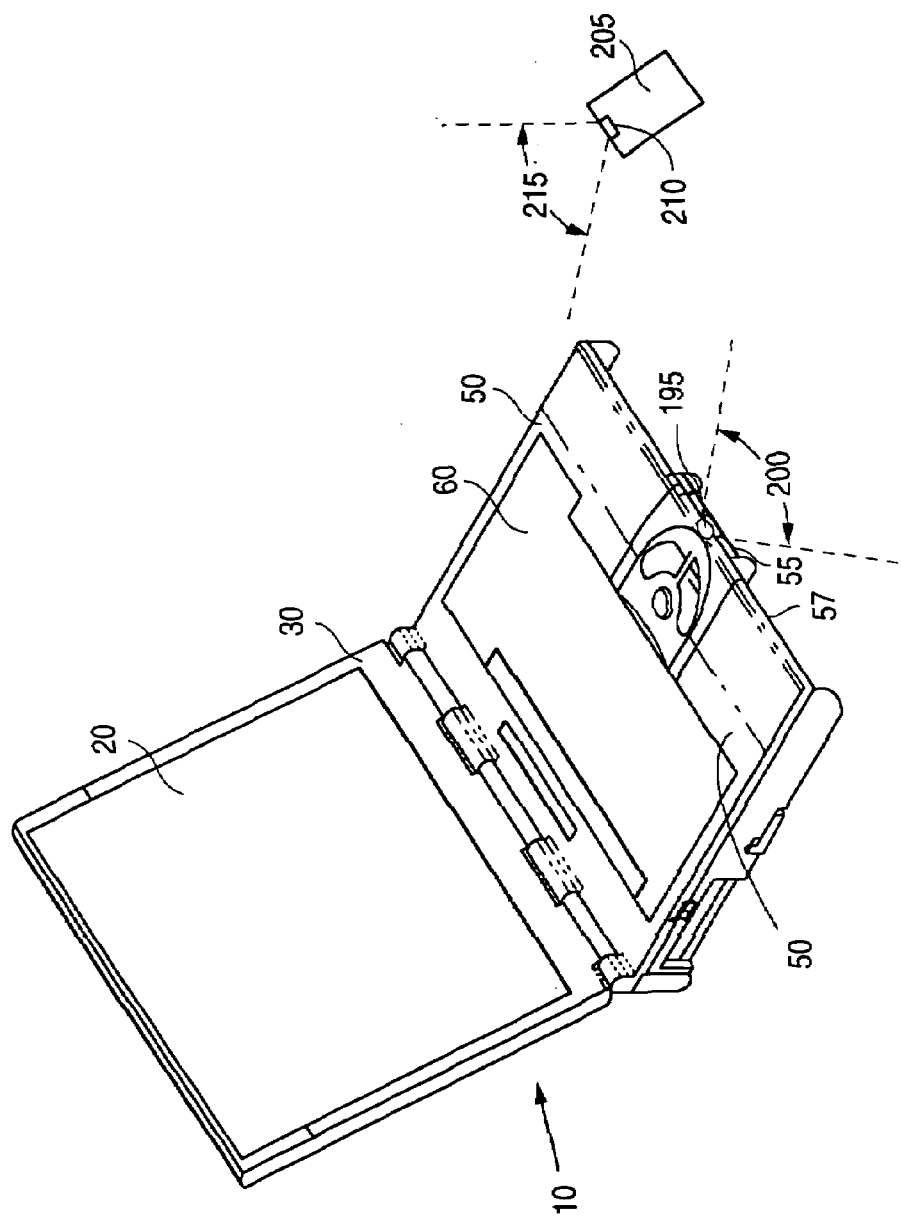
FIG. 3 is a perspective view of the notebook computer of the present invention showing the position and acceptance angle of a sensor disposed along a front edge of the computer base.
Figure 4:
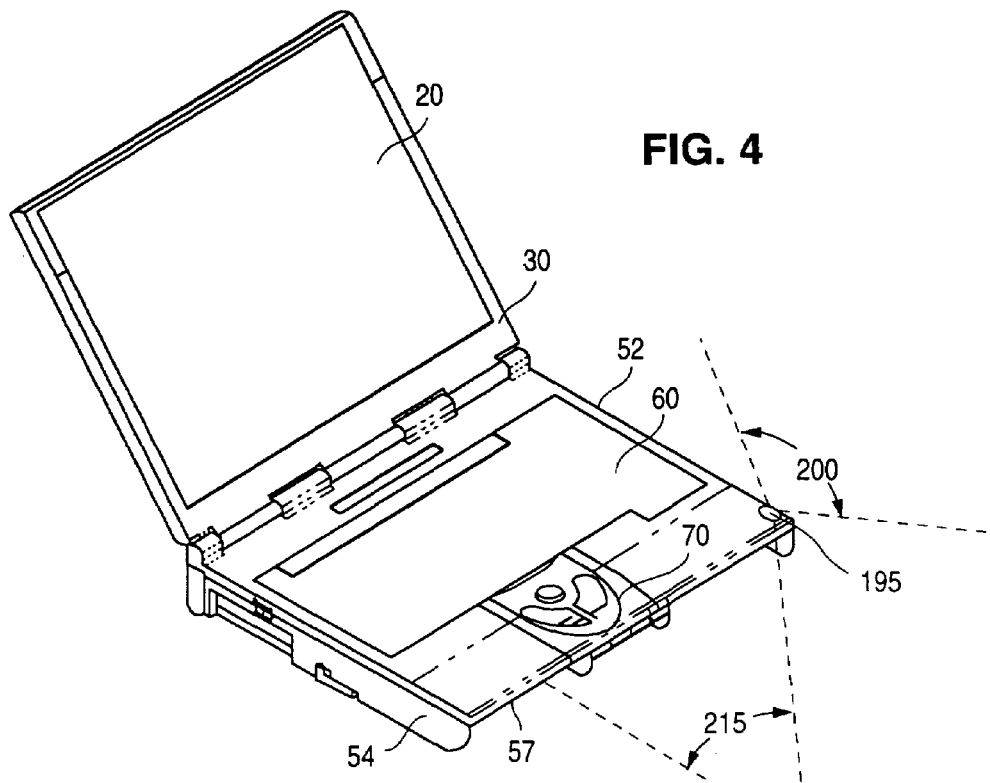
FIG. 4 is a perspective view of the notebook computer of the present invention showing the position and acceptance angle of a sensor disposed along a side edge of the computer base.

However, the inherent angular response of a detector is further limited by shadowing effects. The notebook computer housing tends to shadow, or block, portions of an elliptical infrared beam directed at the notebook computer. FIG. 3 is perspective view of a notebook computer with an infrared sensor element 195 mounted in a cavity region 55 of the front edge 57 of the keyboard. The sensor 195 will intercept an infrared signal within a cone of unshadowed angles 200 in front of the sensor. However, an infrared mouse 205 with an infrared emitter 210 emitting light in an elliptical beam with a diverging beam 215 may not have its infrared signal received by sensor 195 if the mouse 205 is offset from the sensor, located to one side of the keyboard, or if the emitter does not substantially point towards the sensor. FIG. 4 is a perspective view of a notebook computer with a sensor 195 mounted on a side edge 52 of the keyboard. However, a problem with this arrangement is that the sensor 205 is shadowed from the diverging beam 215 of an infrared emitter 210 disposed in the front 57 or opposed side 54 of the keyboard.

The shadowing problem is further exacerbated if an infrared input device is not operated on the same planar surface which holds the notebook computer. This may occur, for example, in some desks with offset side panels which are integral to, or pull out from, the main desk area. For example, an infrared input device operated from a pull-out desk shelf is at a lower elevation and/or angled with respect to the keyboard of a notebook computer operated on a main desk surface. Consequently, the shadowing problems may be extremely severe.

Another problem which exacerbates shadowing is related to the fact that computer users have different preferences regarding how they position and use a mouse. Many right-handed users prefer the mouse to be oriented on the right side of the keyboard whereas many left-handed users prefer a mouse to be oriented on the left-side of the keyboard. Also, some users prefer the mouse to be disposed in front of the keyboard. Mouse response rates are another variable. Many users prefer that the mouse response is set so that the mouse covers the entire screen area with only a few centimeters of mouse movement. However, other users, such as those using computer graphics programs, prefer a very slow mouse response so that they have more control over the mouse function. In many cases, it is likely that the mouse will not be directly pointed at a single edge 52, 54 of the keyboard during part of its normal use. Only a small portion of the edges of the elliptical LED beam may indirectly intercept sensors disposed on the computer base 50.

One possible solution to the shadowing problem is to utilize a plurality of infrared emitters to create a wider and/or stronger infrared beam. For example, the infrared input device could utilize two offset and/or angled LED's to increase the likelihood that part of the diverging infrared beam is intercepted by a keyboard sensor. However, this approach is undesirable because it substantially increases the power requirements of a wireless input device, thereby shortening battery life.

Figure 5:
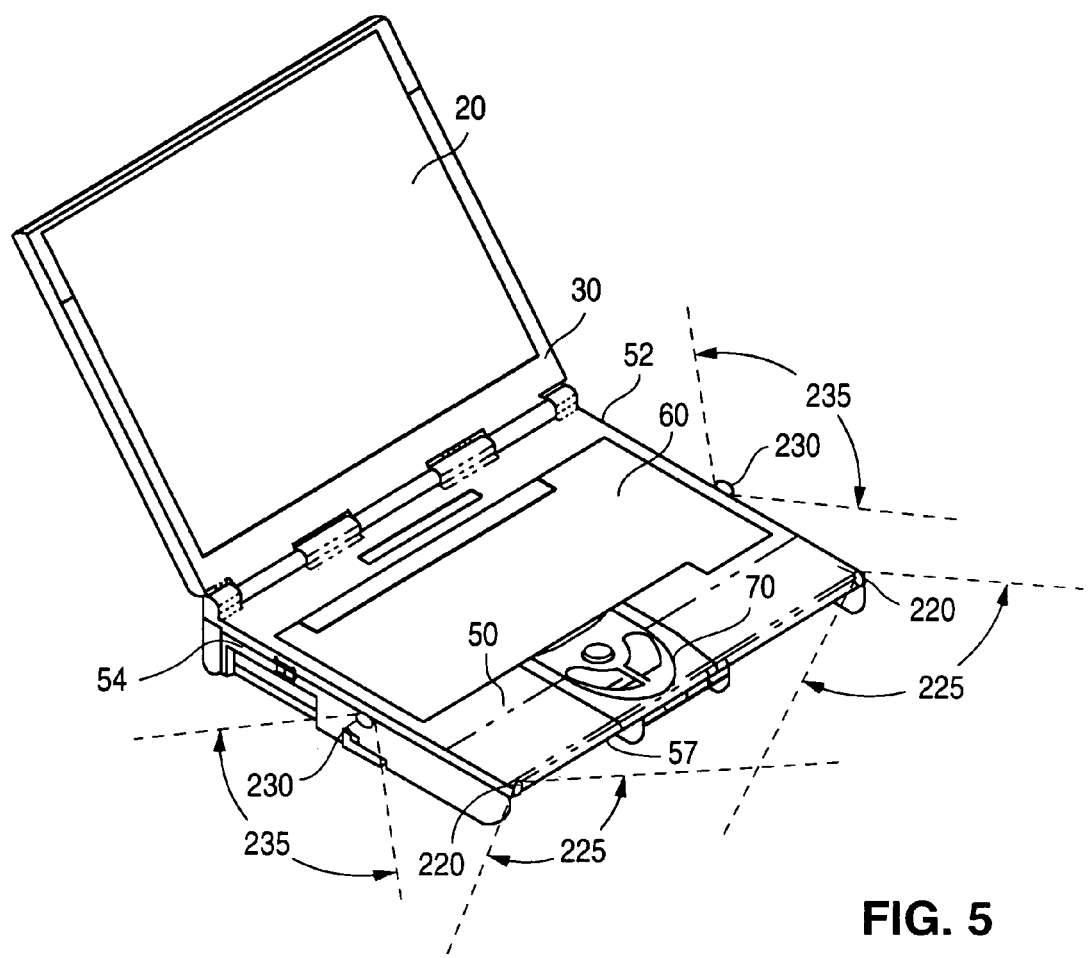
FIG. 5 is a perspective view of the notebook computer of the present invention showing the position and acceptance angle of a plurality of sensors disposed along the computer base.

In the present invention, the location and number of sensors is selected to achieve a wide angle infrared sensor function with a small number of appropriately positioned sensors. A wide angle sensor response is a response for which infrared signals may be received from a radially separated infrared source over a large solid angle comprising at least a substantial fraction of that which would be achieved in an unshadowed single sensor. The inventors have recognized that by changing the location of an infrared sensor disposed on notebook computer 10, shadowing can be mitigated for an individual sensor. Also, the inventors have recognized that using two or more appropriately spaced-apart sensors operating together provides a substantial benefit in the range of angles over which infrared signals may be detected. As shown in FIG. 5, two or more spaced apart detectors 220 along the front edge 57 of the keyboard with overlapping sensor acceptance angles 225 greatly increases the effective acceptance angle. Also, additional sensors 230 with acceptance angle 235 located on one or both side edges 52, 54 of the keyboard further increases the effective acceptance angle. Depending upon the particular sensor optics, about four-to-six sensors mounted on the sides of the keyboard would be required to achieve a wide angle infrared sensor function around the entire plane of the keyboard. While the inventive sensor arrangement shown in FIG. 5 is one possible solution to the shadowing problem, it utilizes a comparatively large number of sensors which increases the cost of the notebook computer. Also, each sensor, including wiring and mechanical connections, consumes precious space and electrical power. Thus, the inventive sensor arrangement of FIG. 5 is not a preferred implementation of a wide-angle infrared sensor function.

Figure 6:
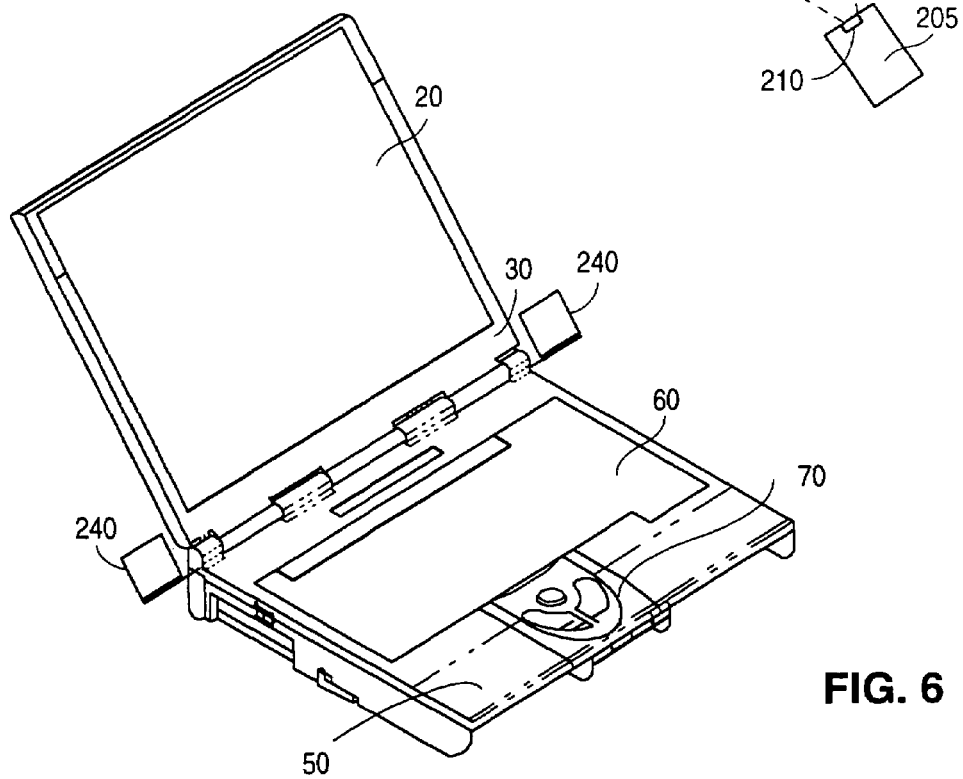
FIG. 6 is a perspective view of the notebook computer of the present invention showing two elevated sensors disposed above the computer base.

As shown in FIG. 6, another means to create a wide angle infrared sensor response is to utilize elevated sensors 240 mounted on the computer base 50. Elevated sensors 240 could slide out or pop-out of the computer base or the LCD bezel. A portion of the elevated sensors 240 is elevated above the surface of the keyboard 60 to prevent the keyboard 60 and computer base 50 from shadowing the sensor. An advantage of elevated sensors 240 is that elevated sensors 240 intercept a portion of the elliptical LED beam from an infrared source which is not co-planar with the base of the notebook computer, such as a mouse operated on a slightly raised surface. The inventive notebook computer of FIG. 6 is one solution to achieving a wide angle infrared sensor function. However, it has the disadvantage that additional mechanical parts are required to form elevated sensors 240 which slide-out or pop-out of the keyboard base or the LCD bezel frame 30. Additionally, it has the disadvantage that the mechanical parts may be fragile.

Figure 7A:
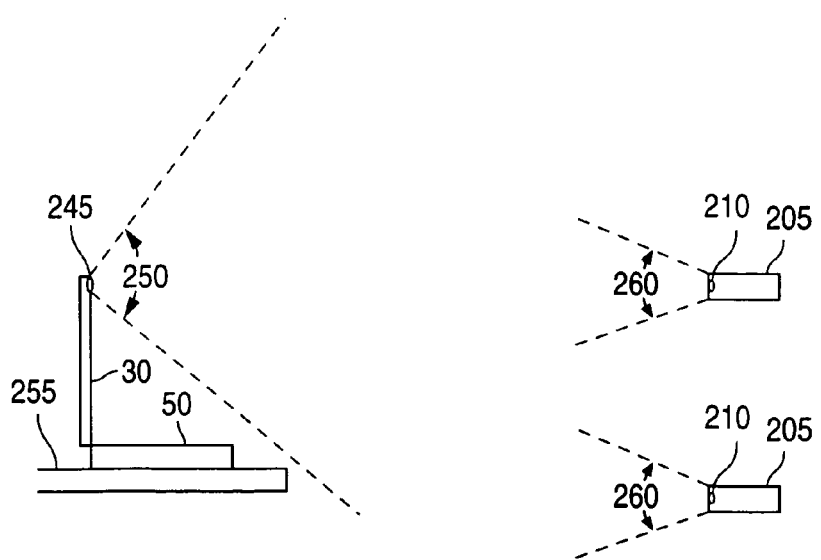
FIG. 7A is a side view of a notebook computer of the present invention showing an elevated sensor disposed on the LCD bezel frame.
Figure 7B:
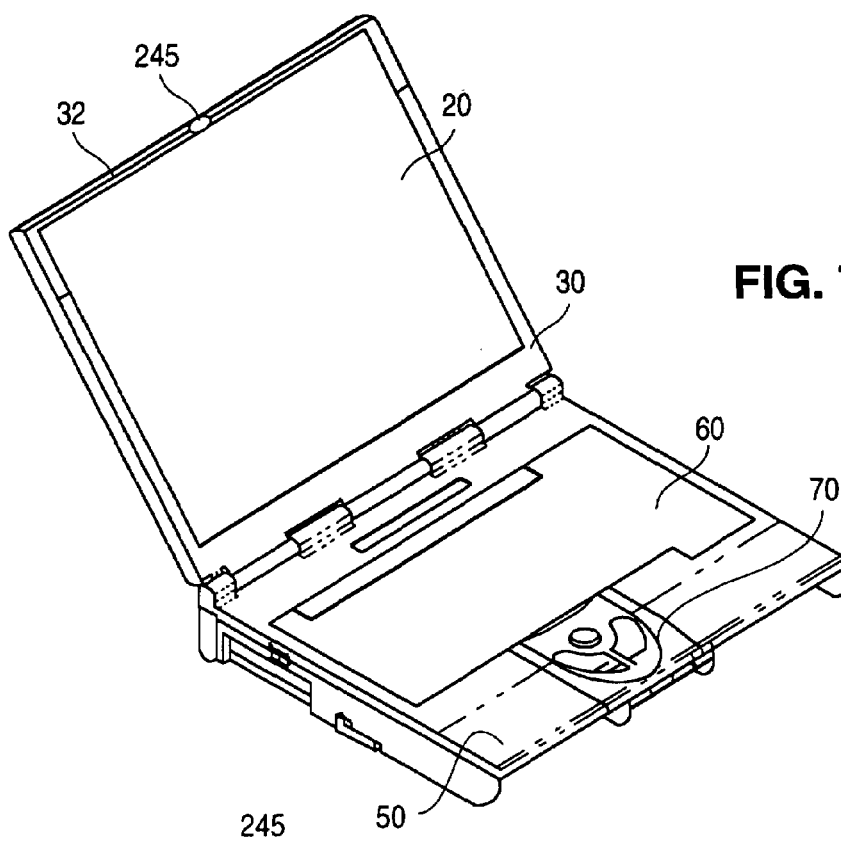
FIG. 7B is a perspective view of a notebook computer of the present invention showing an elevated sensor disposed on the LCD bezel frame.
Figure 7C:
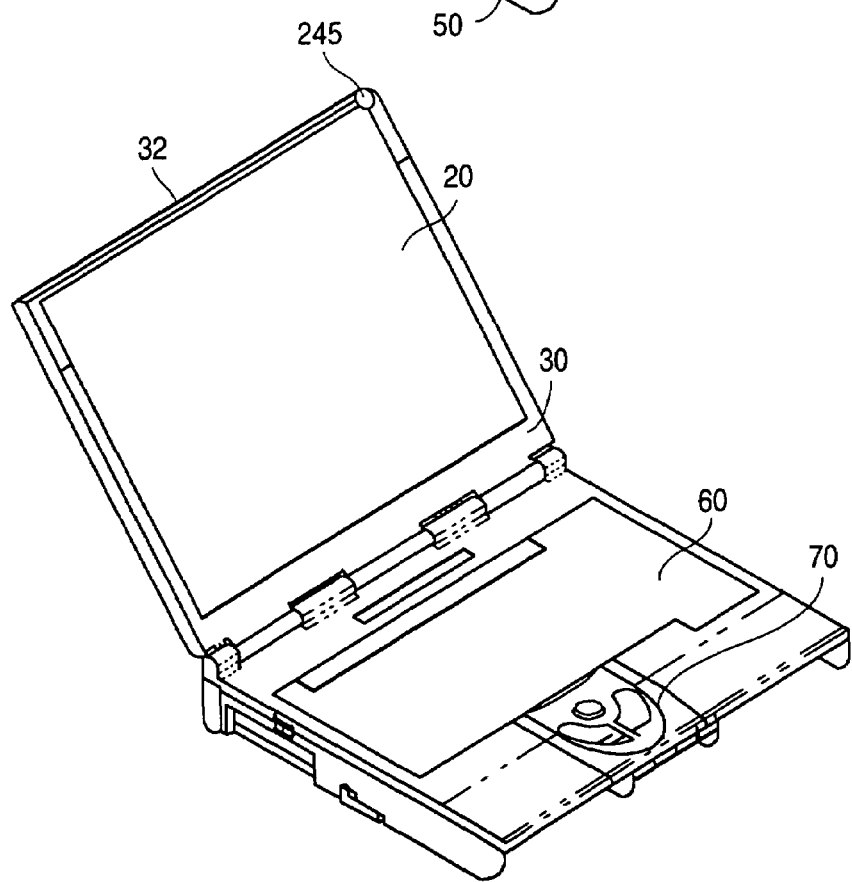
FIG. 7C is a perspective view of another embodiment of a notebook computer of the present invention showing an elevated sensor disposed on the LCD bezel frame.

The inventors have recognized that the advantage of an elevated sensor which is not substantially shadowed by keyboard 60 and computer base 50 can be achieved by mounting at least one sensor on the LCD bezel frame 30. During normal operation the LCD screen 20 has a bezel frame 30 which is elevated above the keyboard 60. Mounting at least one sensor on the bezel frame 30 helps to eliminate shadowing, particularly if the infrared source is operated from a noncoplanar surface. FIG. 7A is side view of a notebook computer in which at least one sensor 245 is mounted on an elevated portion of the bezel frame 30. As shown in FIG. 7A, the cone of acceptance angles 250 for the sensor 245 may include regions beyond a desk or table surface 250 supporting the computer base 50. This facilitates operating an infrared mouse 205 having an emitter 210 with diverging beam 260 from a non-coplanar surfaces, since shadowing from the keyboard 60, computer base 50 and a table surface 250 is reduced. Preferably, at least one sensor is mounted on an elevated portion 32 of the LCD bezel. As shown in FIG. 7B, a single sensor 245 may be mounted on an elevated portion 32 of the bezel frame 30, such as on a center portion of the bezel frame. Alternatively, as shown in FIG. 7C, a single sensor 245 may be mounted towards an upper corner of the bezel frame 30.

Figure 8:
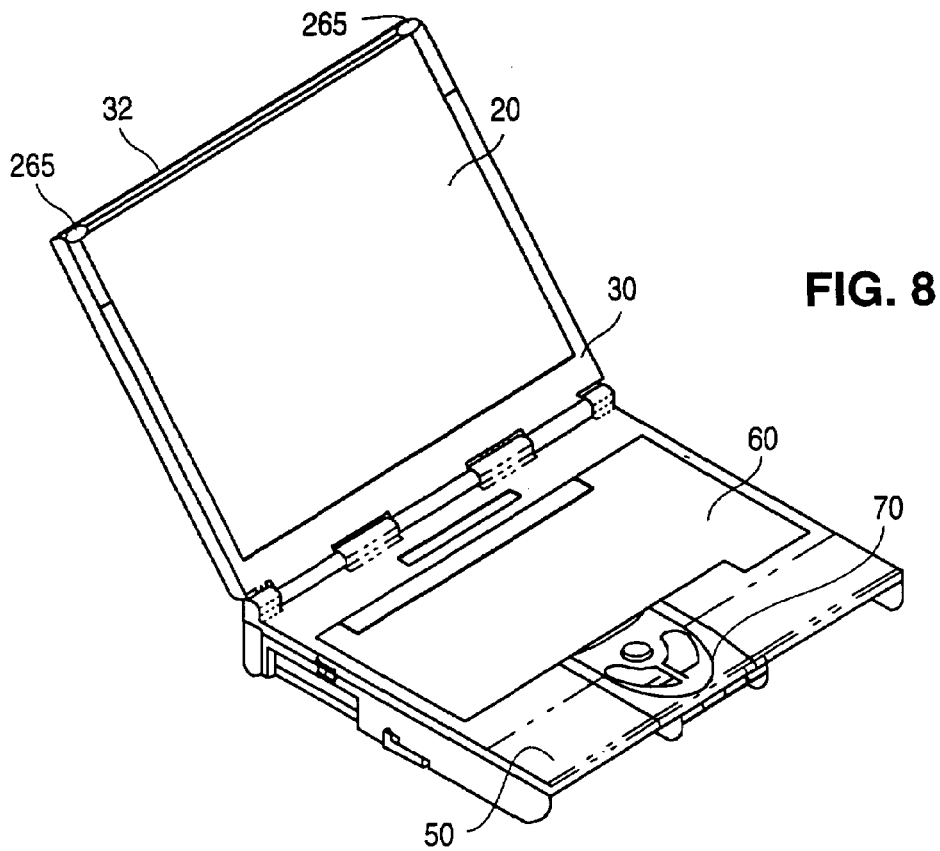
FIG. 8 is a perspective view of a notebook computer of the present invention showing two spaced-apart sensors disposed along the upper edge of the LCD bezel frame.

A single sensor mounted on an elevated portion of the bezel frame is substantially unshadowed. However, the inherent response of the sensor may still not permit as wide an angle of response as desired, particularly towards one or both edges of the keyboard. However, as shown in FIG. 8, two or more spaced-apart sensors 265 may be mounted on an elevated section of the bezel frame 30, such as on an upper portion 32 of bezel frame 30. Also, sensors mounted on the LCD bezel frame 30 may be used in combination with sensors mounted on the computer base 50 to achieve a wide angle infrared sensor function. Additional wide angle lenses may also be used to enhance the sensor function. However, it is desirable to achieve a wide angle sensor function with a minimum number of sensors, expensive lenses, and mechanical components.

Figure 9:
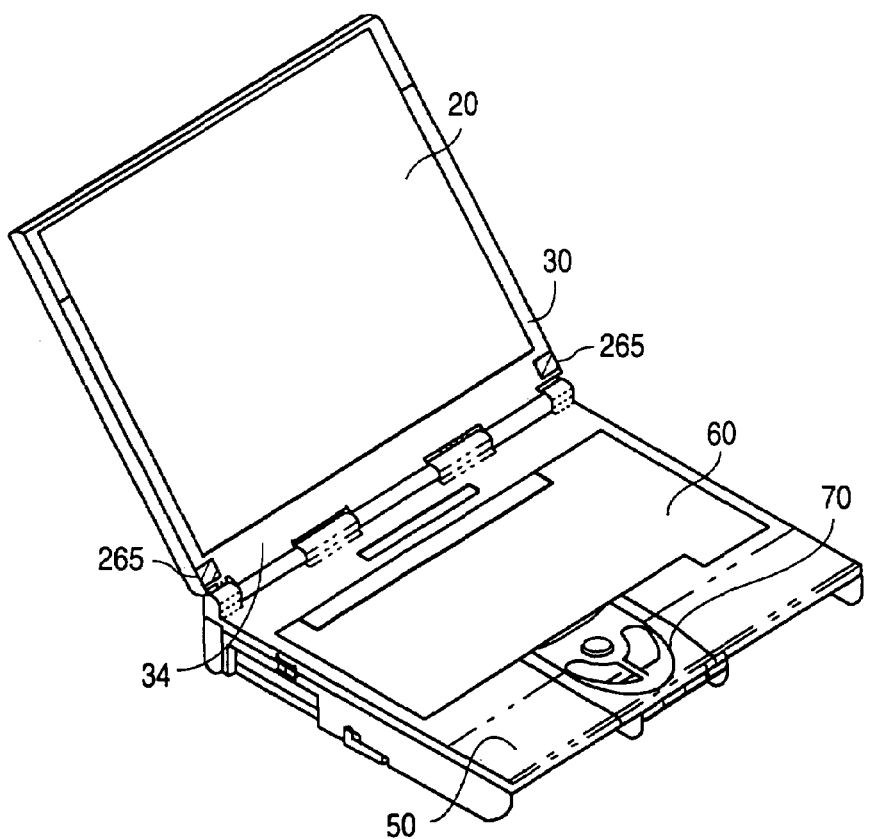
FIG. 9 is a perspective view of a preferred embodiment of the notebook computer of the present invention comprising two space-apart sensors disposed along the lower edge of the LCD bezel frame.
Figure 10:
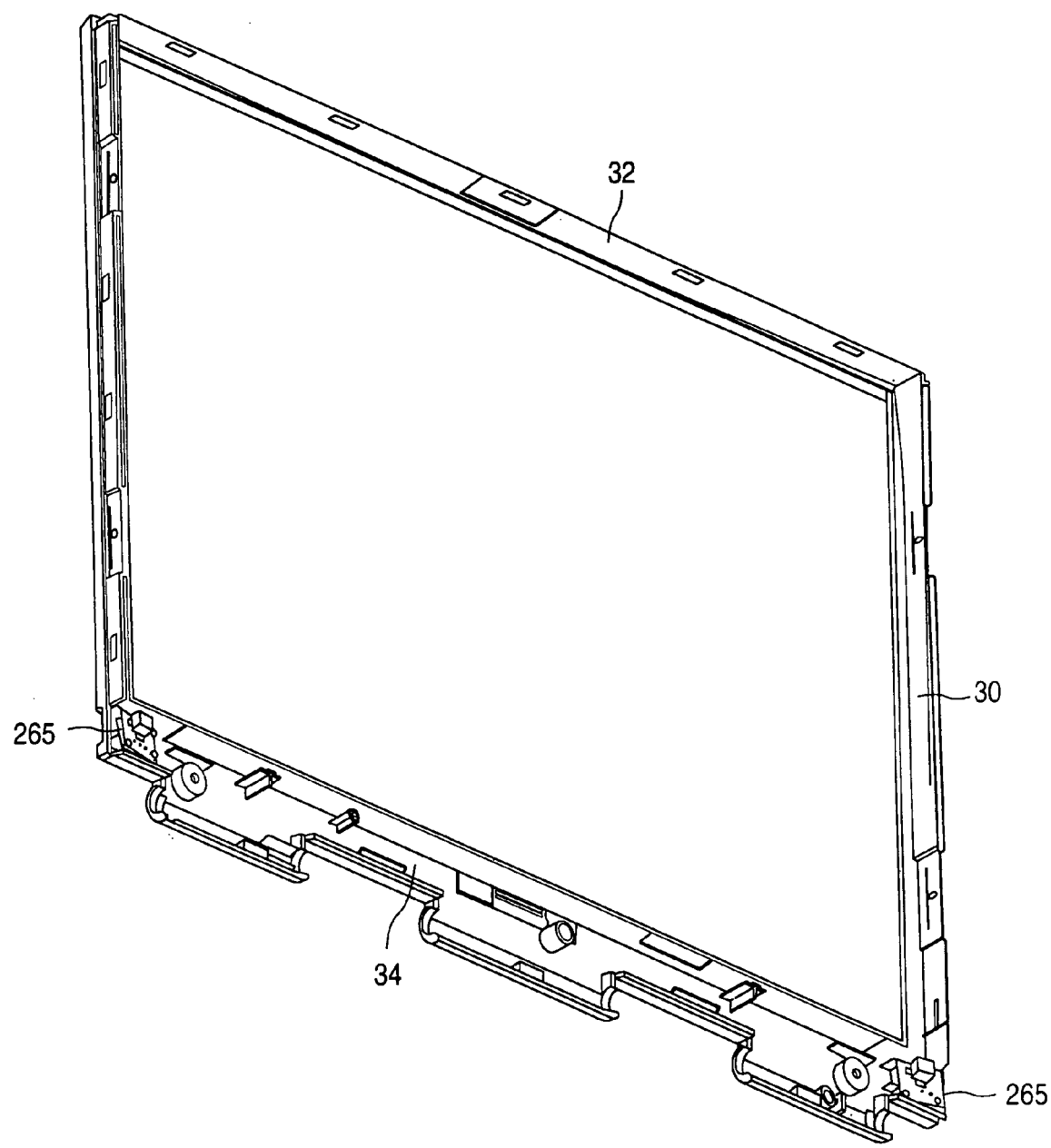
FIG. 10 is a rear view of the LCD bezel frame of FIG. 9, showing the orientation of the sensors.
Figure 11A:
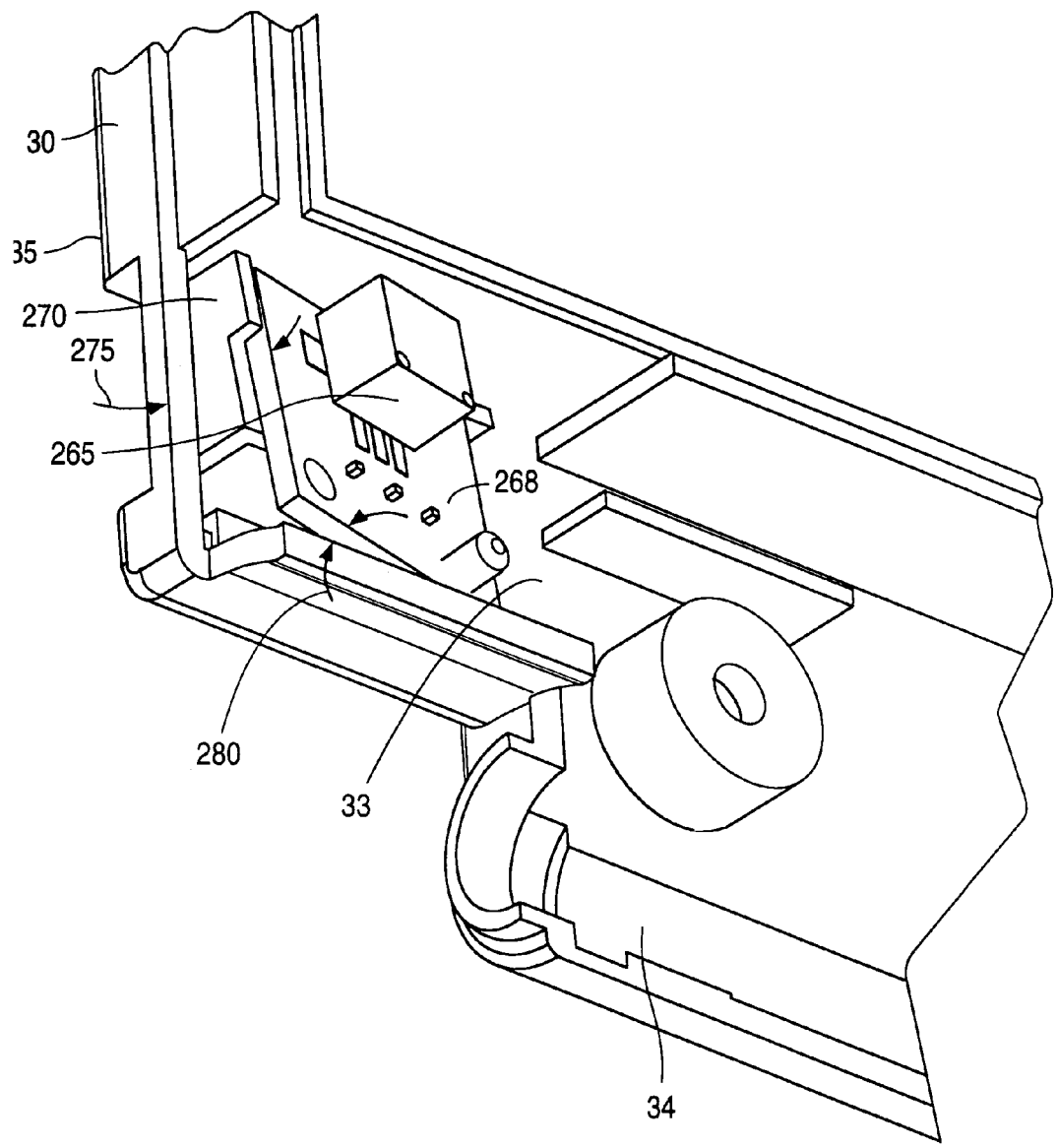
FIG. 11A is a detailed view of one sensor of FIG. 10.
Figure 11B:
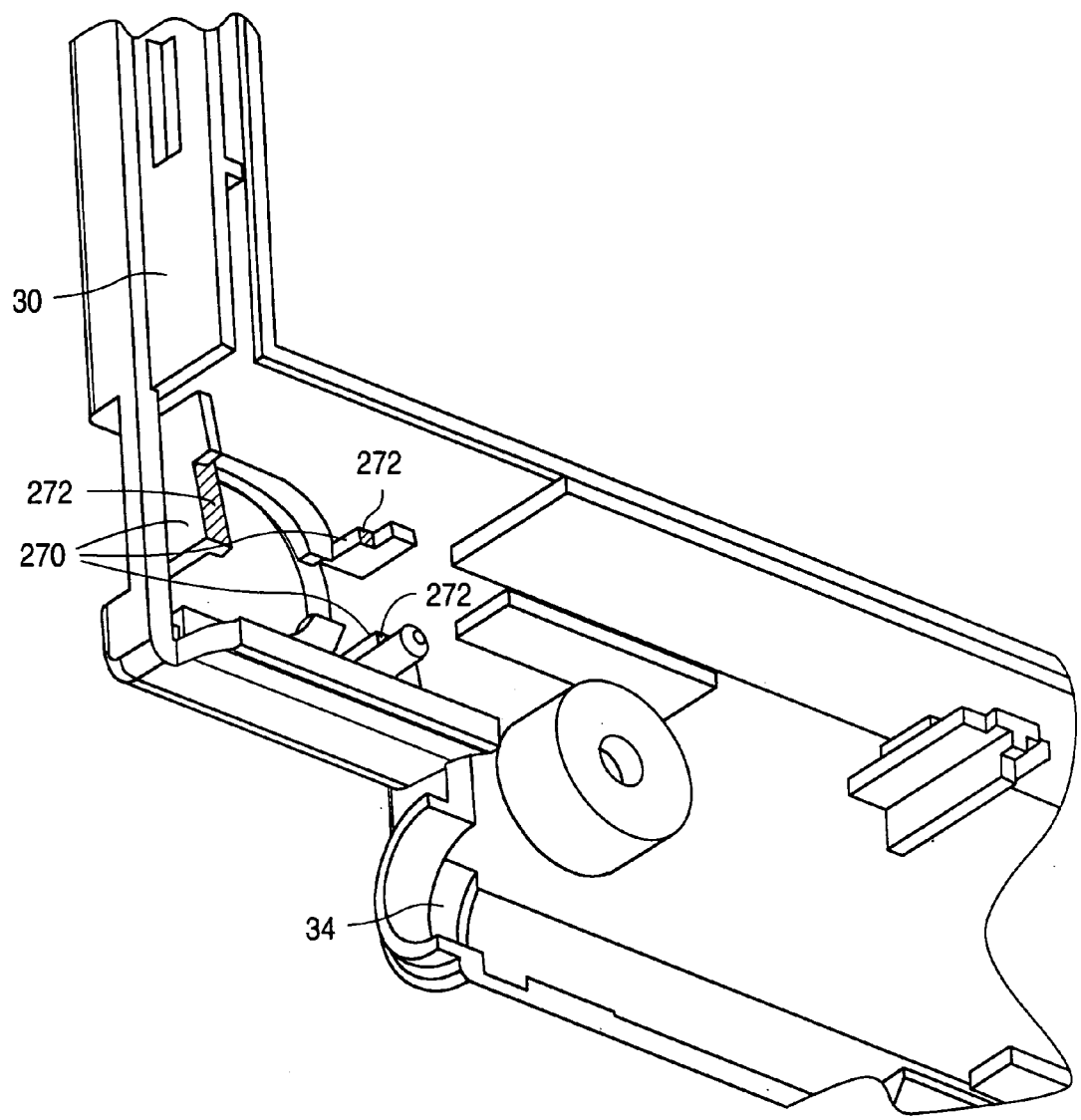
FIG. 11B is a perspective view of the seating elements used to achieve the desired sensor orientation for the sensor of FIG. 11A.

The inventors have experimentally determined that appropriate placement and angling of the sensors may be used to achieve a wide angle sensor function using only two conventional sensors. FIG. 9 shows a preferred embodiment in which two sensors 265 are spaced apart along the bottom edge 34 of the LCD bezel frame 30. This design has the advantage that it is easier to mount conventional infrared sensors along the bottom edge 34 because of the space constraints. FIG. 10 is a rear view of the LCD bezel 30 in the preferred embodiments showing the sensors 265 mounted near the bottom edge 34 of the bezel frame 30. The sensors are mounted so that during operation the sensors are pointed slightly down and to the sides of the notebook computer. FIG. 11A is a detailed view of one sensor 265 attached to a mounting frame 268. One or more plastic seating elements 270 allow conventional sensors to be directly inserted at the preferred angles with respect to the rear surface 33 or front surface 35 of the housing forming the LCD bezel frame 30. As shown in FIG. 11B, the seating elements 270 may be molded pieces that define surfaces 272 upon which the mounting frame 268 of sensor 265 seats. However, while FIG. 11B shows an inexpensive technique to achieve the desired sensor angles, other techniques are also possible. In particular, the seating elements 270 could also comprise adjustable elements, such as screws to adjust the height of the seating surfaces 272 so that the sensor angles could be adjusted by the user.

Preferred sensor angles are with the sensors pointed downwards toward the front edge 57 of keyboard 60 with an arc angle 275 less than about nine degrees and out towards the sides 52,54 of the keyboard with an arc angle 280 of about thirteen degrees. In the preferred embodiment, angling the sensors slightly down toward the keyboard facilitates operating an infrared mouse in front of the notebook computer. Angling the sensors slightly out towards the edge of the keyboard facilitates operating an infrared mouse on either side of a notebook computer. FIG. 12A is a top view, not to scale, illustrating two sensors with respect to the keyboard. Angling the sensors 265 out to the sides of the computer base 50 improves sensor reception in these areas. FIG. 12B is a side view, not to scale, showing a sensor angled with respect to the LCD screen 20. Angling the sensor down improves sensor response in an area directly in front of the keyboard. The slight tilt of the sensors in the preferred embodiment provides the benefit that it permits a small number of sensors (two) to perform a wide angle sensor function which ordinarily would require three or more sensors and/or additional optical elements.

The preferred sensor angle orientation will depend upon the placement of the sensors 265 on notebook computer 10 and other details, such as the lenses used to couple light to the sensors. However, inexpensive sensors typically have comparatively simple optics, such as a wide angle window (e.g., a "bubble" window) which permits light to impinge upon a substantially-planar detecting surface. The desired sensor angle can be determined by principles of geometric optics to minimize deleterious shadowing effects. Moreover, while fixed sensor angles are the simplest to manufacture, adjustable sensor angles are within the scope of the present invention. For example, many users operate their mouse only along one portion of the keyboard 60. Consequently, a sensor response which is optimized for mouse position in front of and along one side of the computer base 50 may be preferable for some users. Also, in some cases a salesperson may desire to give a presentation from an extreme angle to the side of the computer base 50. To accommodate these situations, one or more sensors 265 could have set-screws or set-pins to permit the user to customize a wide angle sensor response consistent with their individual use.

FIG. 13 is a schematic electronic block diagram of the sensors 265, which preferably comprise standard commercially available sensors, such as the Toshiba Photo IC Model TPS831. At least two sensors are used in the preferred embodiment. The sensors preferably are part of a receiver unit that includes an optical filter, such as a bandpass filter tuned to a range of wavelengths around the center LED frequency. A mixer 285, such as an OR gate, may be used as a signal combining element to combine signals from several sensors. The signals may then be fed into a microprocessor protocol translator 290 to translate the pulse modulated signals into position information.

The present invention also comprises a power management approach to improve battery lifetime in the detachable input unit 100. The preferred embodiment of FIG. 2A, 2B, 2C, and 2D is too small to be consistent with a power supply comprising two conventional AA batteries. The preferred power supply is a compact 3V camera battery, which has a diameter of about one and a half centimeters and a length of slightly more than two and a half centimeters. However, the total stored energy in a compact camera battery is limited. The inventors have estimated that conventional infrared mouse designs, if powered by a miniature camera battery, would only have a useful lifetime of at most a few weeks of continuous use. The useful battery lifetime would be further decreased if the infrared transmitter power was increased to permit the mouse to be used more than an extremely short distance from the notebook computer. The short battery lifetime is not only costly but is also inconvenient to the user.

The inventors have recognized that an energy efficient power management approach permits a substantial increase in battery lifetime. FIG. 14 is a block diagram showing the block electronic functions of the detached input module 100 of the present invention. A power source 450 preferably comprises a compact camera battery. The power source 450 powers an infrared transmitter 405, microprocessor control circuit 400, touch pad 420, and rotary encoders 410, 415, used to sense the position of mouse ball 140.

One significant improvement in power management is to utilize one or more miniature switches 190 as an infrared power control switch 425 on detached input device 100 to permit the user to adjust the strength of the infrared transmitted power appropriate for a particular application. As is well known, the power density of a diverging laser beam tends to decrease with the square of the distance from the source. Consequently, a doubling of the distance between the input device to the notebook computer while maintaining the same signal strength requires a four-fold increase in transmitted power. However, since users may desire to use the input device 100 in different ways, power is wasted if the infrared beam strength is fixed at the minimum required for long-distance (e.g., two-to-three meters) use. Preferably, the infrared power control switch 425 has switch positions corresponding to an "off mode", a "short range" mode, and a "long range" mode. An "off mode" permits the electronics to be completely shut down when the input device 100 is not in use, such as when glide point 70 is used and the detached input device is stowed in its cavity. The short range mode permits the infrared power to be selected to provide a signal which can be received from a comparatively short distance, such as a half-meter or less from the notebook computer. The long range mode can be used to increase the power appropriate for long range applications (e.g., a customer presentation), such as a separation distance of between one- half meter to three meters. Note that the above described ranges are illustrative ranges corresponding to different ways that an infrared input device 100 may be used. Generally, the miniature switch 190 could have several discrete power settings or a slide switch to permit a continuous range. Preferably the miniature switch 425 permits control of the infrared output power by at least a factor of ten so that the power can be adjusted to maintain a minimum intercepted power density for a greater than a factor of three variation in the distance between the input device and the notebook computer. The ability to increase transmitted infrared power is also useful in some short range applications in which only a small fraction of the transmitted beam is intercepted by the notebook computer, such as operating a mouse from an offset or tilted surface. Having a range of infrared power settings permits users to choose transmitter power settings sufficient for a variety of special applications.

Microprocessor control circuit 400 preferably operates infrared LED transmitter 405 in a manner which reduces the quiescent power of the infrared LED transmitter 405 when no cursor position inputs are being made by the user. In the present invention an infrared pulse transmitter 405 using pulse position modulation with start/stop bits to signify the transmission of new bytes of position data is utilized because it is a simple implementation of a pulse modulation data format that does not consume transmitter power when position update data is not being sent. This is shown in FIG. 14B. However, other pulse-modulation data formats which are familiar to those of ordinary skill in the art of infrared control device and infrared communications systems may also be used, such as pulse-width modulated pulses. Thus, the microprocessor 400 preferably sends cursor position update information in the form of pulses (e.g., pulse width modulation or pulse position modulation) so that no infrared transmitter power 405 is consumed when the input device 100 is in a quiescent state.

Preferably the microprocessor 400 is selected to have a low quiescent power requirement. Those of ordinary skill in the art of microprocessor circuit design are presumed familiar with design choices which reduce the quiescent power requirements of a microprocessor system.

Figure 14A:
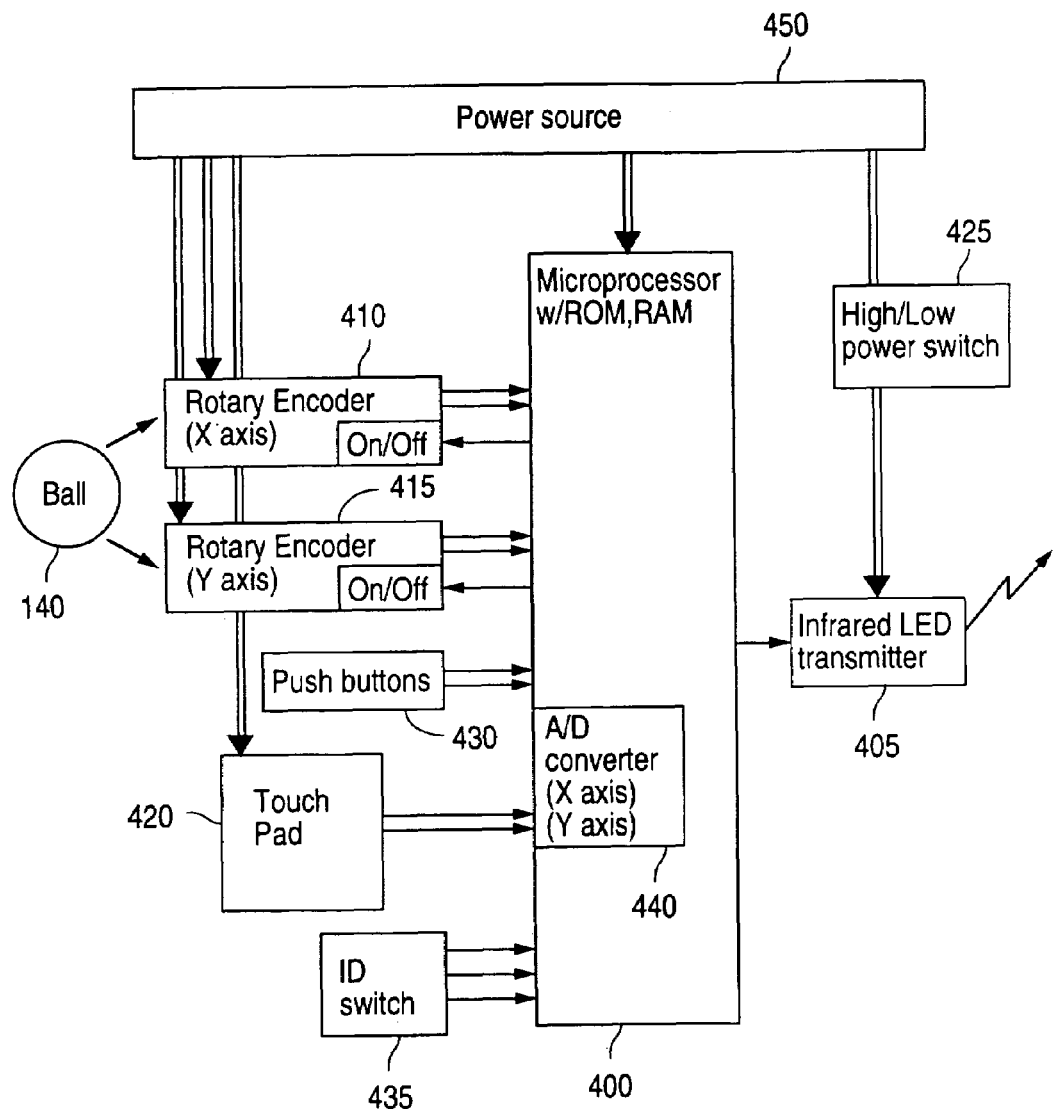
FIG. 14A is an electronic block diagram of the input module of the present invention.
Figure 14B:
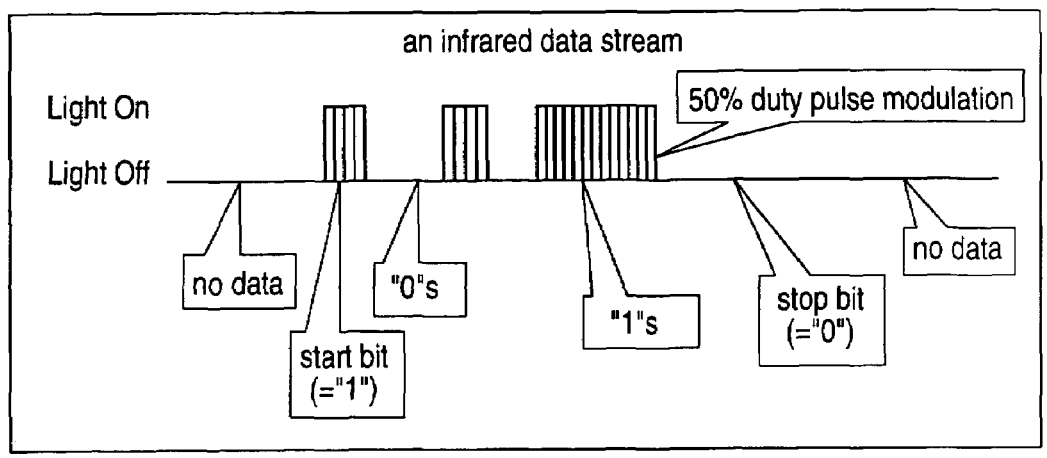
FIG. 14B is an illustrative plot of a stream of pulse position modulated pulses produced from the infrared transmitter of FIG. 14A.
Figure 15:
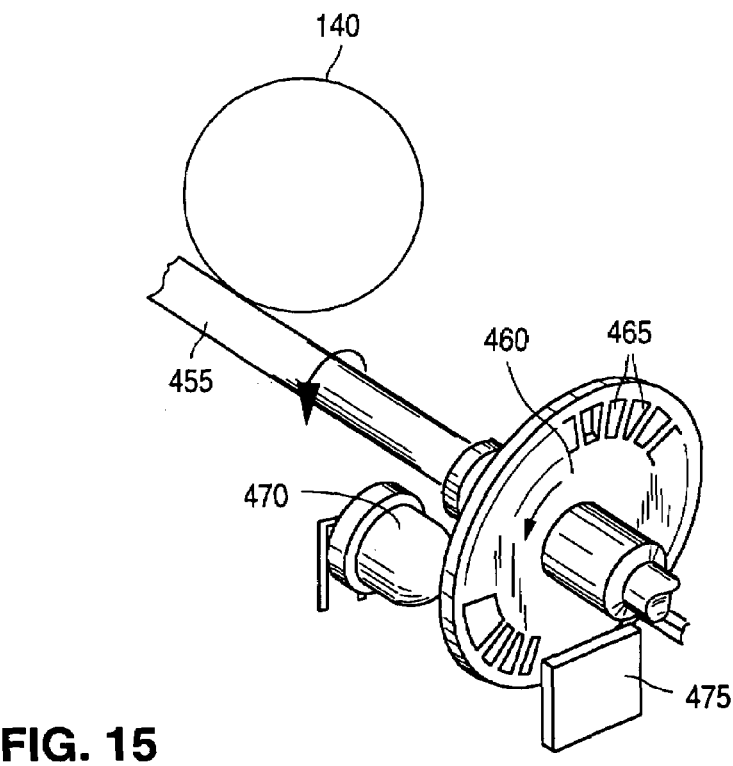
FIG. 15 is a perspective view of a single conventional rotary encoder used to determine mouse-ball position in one direction.

Referring to FIG. 14A, there are also additional power consuming elements in addition to the infrared transmitter. The mouse push buttons 430 may consume a small current when they are switched. However, in a quiescent mode they do not consume power. Depending upon its implementation, a touch pad 420 consumes little or no power in a quiescent mode. Other electronic inputs to the microprocessor, such as an identification switch 435, may also be designed to consume negligible power in a quiescent mode. However, a conventional mouse has rotary encoders 410, 415 which consume substantial amounts of power even in a quiescent mode. Referring to FIG. 15 which shows one rotary encoder, in a conventional mouse or trackball the change in position of the ball 140 in one direction (x or y) is coupled to an axis 455 which changes the position of a slotted disk 460 having a plurality of radial slots 465. The relative motion of the slotted disk 460 is measured using one LED lamp 470 and one photo-transistor 475 to form what is termed a "photo-interruptor." As the slotted disk 460 rotates, slots 465 come into alignment with the LED 470 and phototransistor 475, producing a series of electronic pulses which can be used to accurately determine small changes in the position of the mouse ball along one axis. A measurement system which utilizes two photo-interruptors similar to that of FIG. 15 to determine mouse position in the x and y direction is commonly known as an optical encoder.

The size and number of slits 465 on the slotted disk 460 of each rotary encoder is typically selected so that small motions of the mouse ball 140 may be accurately measured. However, in order for the optical encoder to perform an accurate measurement function, the two LED lamps must be operated in a continuous mode, which consumes substantial energy even when the input device 100 is in a quiescent state. In a quiescent state with the transmitter 405 off and the microprocessor controller 400 in a quiescent mode, the rotary encoders 410, 415 used to sense mouse ball 140 movement constitute a substantial fraction of the total power requirement.

Conventional "sleep" methods used in notebook computers to power down high current electronics cannot be used in a detachable wireless mouse. In a conventional sleep mode used in a notebook computer, an interrupt signal from a sensor (e.g., the touchpad or a keyboard key) provides an interrupt signal used by a control circuit to awaken high current electronics, such as the hard drive. However, in an infrared mouse the rotary encoders are the largest quiescent current drain on the battery so that conventional power conservation approaches are inapplicable.

In the present invention, the optical encoder is comprised of two rotary encoders 410, 415 which are preferably operated in two distinct modes. The first mode comprises a conventional optical encoding mode in which the photo-interruptors are powered continuously to permit accurate determination of the position changes of the mouse ball 140. The second mode comprises a low power motion-sensor mode in which the photo-interruptors are operated in a pulsed (strobe) mode. The low-power motion-sensing mode is inconsistent with accurate sensing of trackball position because the LED lamp 470 is pulsed on and off. In a strobe-mode, the motion of mouse ball 140 results in only a small fraction of the number of electronic pulses which would ordinarily result in a continuous mode of operation. Moreover, in a strobe-mode the rotary encoder does not provide accurate information on the motion of the mouse ball 140. However, the inventors have recognized that in a strobe-mode data pulses from a rotary encoder indicate that the mouse has been moved by the user. In a pulsed mode the rotary encoder acts like a motion sensor. Data from the rotary encoder operated in a pulsed mode can be used to provide an interrupt signal to a microprocessor controller 400. The control circuit 400, acting in response to an interrupt signal, can then awaken the optical encoder to operate in a continuous position-determining mode. As shown in FIG. 14A, each rotary encoder 410, 415 preferably may be enabled/disabled by microprocessor 400, thus permitting the rotary encoders 410, 415 to be operated in either a pulsed motion-sensing mode or a continuous accurate position-sensing mode.

Figure 16:
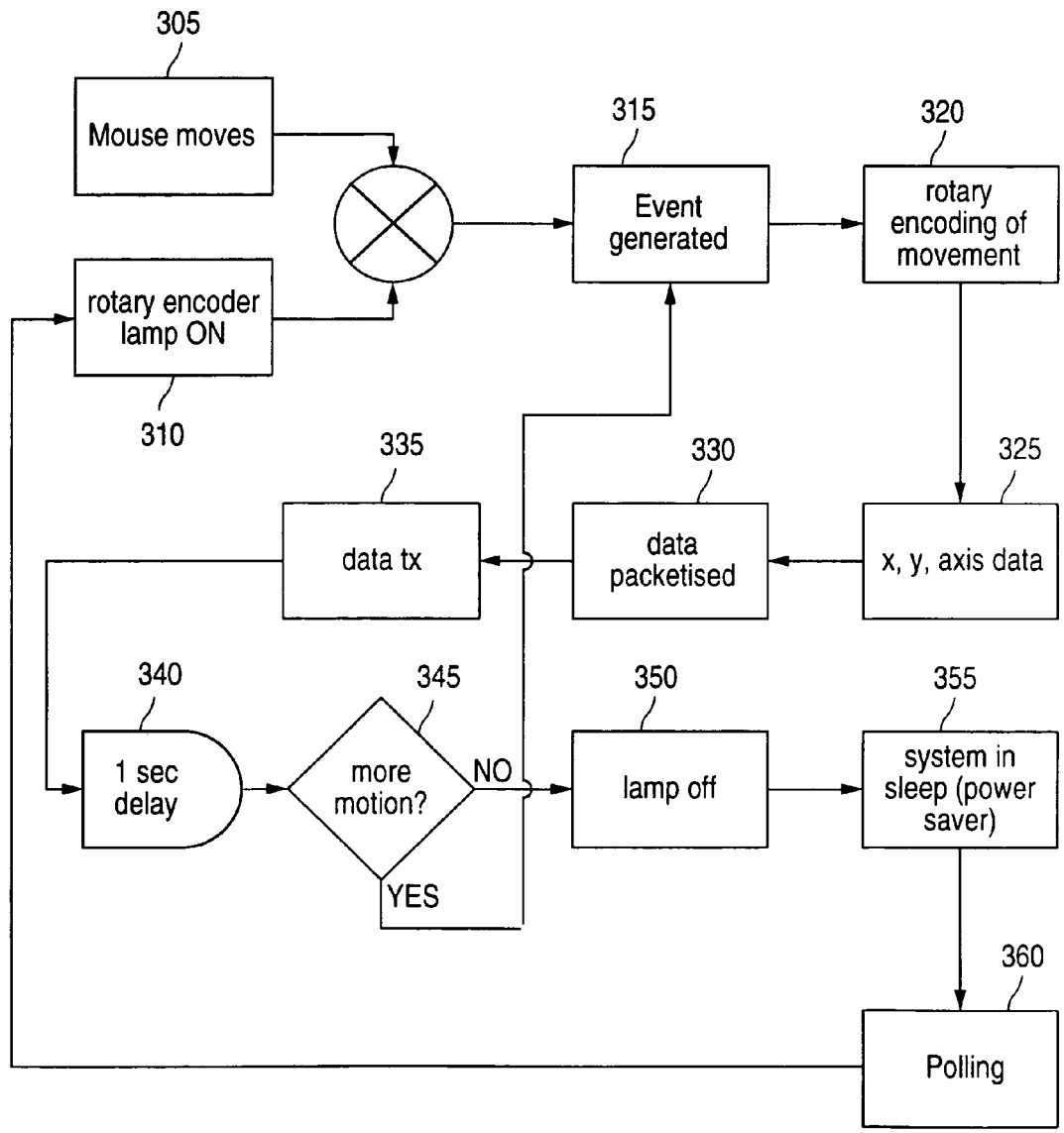
FIG. 16 is a flow chart showing the inventive method of utilizing rotary encoders as low-power motion sensors during quiescent periods.

FIG. 16 is a flow chart showing a preferred sequence of steps to conserve quiescent photo-interruptor power. The polling mode comprises a mode in which the controller 400 operates the photo-interruptors in a pulsed mode with a low duty cycle, such as a mode of operation with less than a 1% duty cycle pulses (e.g., pulses less than 100 nanoseconds long and with a period of between about 0.1 second to 0.3 seconds). In the polling mode 360, the photo-interruptors periodically poll (test) the state of the rotary encoders and compares it to the last recorded state stored in the microprocessor 400 memory of the mouse. If movement is detected, the microprocessor 400 switches the optical encoder LED lamps 470 into an accurate sensing mode in which the rotary encoders 310 are operated in a continuous mode. Once the rotary encoders 310 are switched on, accurate sensing occurs. Additional mouse 305 position information or button information results in an event 315 so that rotary encoding 320 of the movement takes place resulting in x,y data 325 being converted into pulse data 330 which is transmitted 335 to the notebook computer. The microprocessor preferably keeps the photo-interruptors on for a short additional time in the absence of further inputs, such as a one-second delay 340. If more mouse motion 345 is sensed, then the LED lamp stays on and x,y data continues to be transmitted. However, if no mouse motion 345 is detected after one second (or some other suitable period), the photo-interruptor is switched back into a lamp-off 350 mode. The photo-interruptor is then switched into sleep (polling) mode 355, which periodically polls 360 the state of the rotary encoders.

The preferred sleep mode thus saves substantial power while still being user friendly. The polling period can be short enough (e.g., 0.1 seconds) so that the mouse begins accurate optical encoding 320 of mouse motion within a short time period (e.g., less than about 0.2 seconds) after the user moves a mouse that has been in the low-power polling mode. The turn-on response time is fast enough that from an ordinary user's perspective the mouse behaves as if it is always awake. However, the comparatively fast (e.g., less than one second) switch into a polling mode after the cessation of new inputs results, electronically, in a mouse which is normally in a power-conserving polling-mode in the absence of continuous inputs. The method illustrated in FIG. 16 can reduce the quiescent power required to operate two rotary encoders comprising an optical encoder by a factor of up to one-hundred.

The inventive input device 100 preferably has an identification code switch 435 which can be used to prevent undesirable cross-talk between the notebook computer and other infrared control devices. As previously discussed, the data is preferably transmitted as infrared pulse position modulated (PPM) pulses, although other pulse modulation schemes could be used as well. Preferably, as shown in FIG. 17, the position information is transmitted in a block of three bytes, each of 8 bits, which is transmitted every thirty milliseconds. The first byte 505 contains information on the mouse button switch position, a three-bit identification (ID) code 506, and additional parity, check, and/or start/stop bits. The second byte 510 contains information on the x-position data while the third byte 515 contains information on the y-position data. The utilization of a first byte containing an ID code 506 and parity bit helps to mitigate possible interference problems.

One possible drawback with the wide angle infrared sensor of the present invention is that infrared signals from other infrared control devices may be received and hence corrupt the data inputs. For example, in some situations, other infrared control units (e.g., television controllers) may be used in the same room as the notebook computer. Including a parity/check bit makes it extremely unlikely that other infrared control units will cause deleterious cross-talk. However, since some companies purchase substantially the same notebook computer for all staff members, it is possible that two or more notebook computers of the present invention may be utilized in close proximity to one another. Thus, it is preferable that the unit has a user settable ID code 506 that may be set by the user on the input device, with a corresponding means to adjust the code in the notebook computer (e.g., in a user preference program). An ID code switch 143 may be included in the detached infrared input device to permit the user to adjust the ID code 506. This permits the user to adjust the ID code 506 to prevent cross-talk. However, while the prevention of crosstalk is normally desirable, there may be some circumstances in which jamming is not a problem. For example, two salespersons giving an interactive presentation may want to adjust the codes of their input modules 100 so that they can alternately provide cursor control (or other inputs) to one of their computers 10 during a presentation to a group of customers. This would permit two (or more) salespersons to provide inputs to one notebook computer during a presentation without having to physically hand-over one infrared input device. However, for this case the two users may have to coordinate their activities in order to not transmit data at the same time from the two infrared input devices to the notebook computer.

Figure 21:
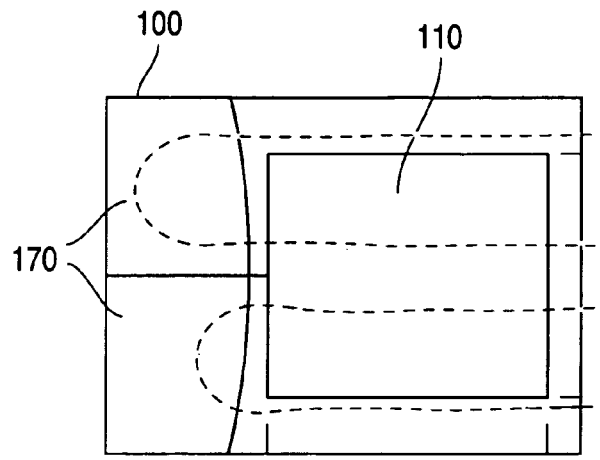
FIG. 21 shows a top view of the input module with two thumbs, in phantom, superimposed above the surface.

The inventive detached input device may be used as either a mouse or as a touch pad. As shown in FIG. 18, the unit is preferably sized so that a hand (shown in phantom) may grip the unit with the thumb to one side and the index and middle fingers controlling the mouse buttons 120. This grip is comparable to that of a conventional mouse, although the comparatively small size of the unit means that only a portion of the thumb grasps the flared edge 130. Indeed, if the unit was substantially shorter than its preferred length of about seven centimeters it would be awkward to use the tip of the thumb to help control the mouse movement. As shown in FIG. 19, the unit's size and flared edges 130 make it easy to change the hang grip so that the unit can be used as a touchpad 110. As shown in FIG. 16, the unit is short enough that a user can control the mouse buttons 120 with their thumb while the unit rests in the palm of a hand (shown in phantom). However, as shown in FIG. 20 the unit is preferably narrow enough that a user can easily bend their thumb to touch any portion of the touchpad 110 while the unit rests in the palm of their hand. As shown in FIG. 21, the preferred dimensions of the upper surface of unit 100 corresponds to an area of about two average-male thumbs-widths (shown in phantom) in width and one average-male thumb-length in length. Experiments by the inventors indicate that the unit cannot be made substantially smaller without becoming uncomfortable to use in either or both modes (mouse or touchpad). Also, experiments by the inventors indicate that flaring both edges 130 of the unit 100 facilitates a comfortable grip for both mouse and touchpad uses. Also, flaring both edges with the same angle makes the unit comfortable for both left and right handed users. The input device is thus an ergonomic unit designed to be compact yet also providing a comfortable hand grip for either mode of use.

Figure 22:
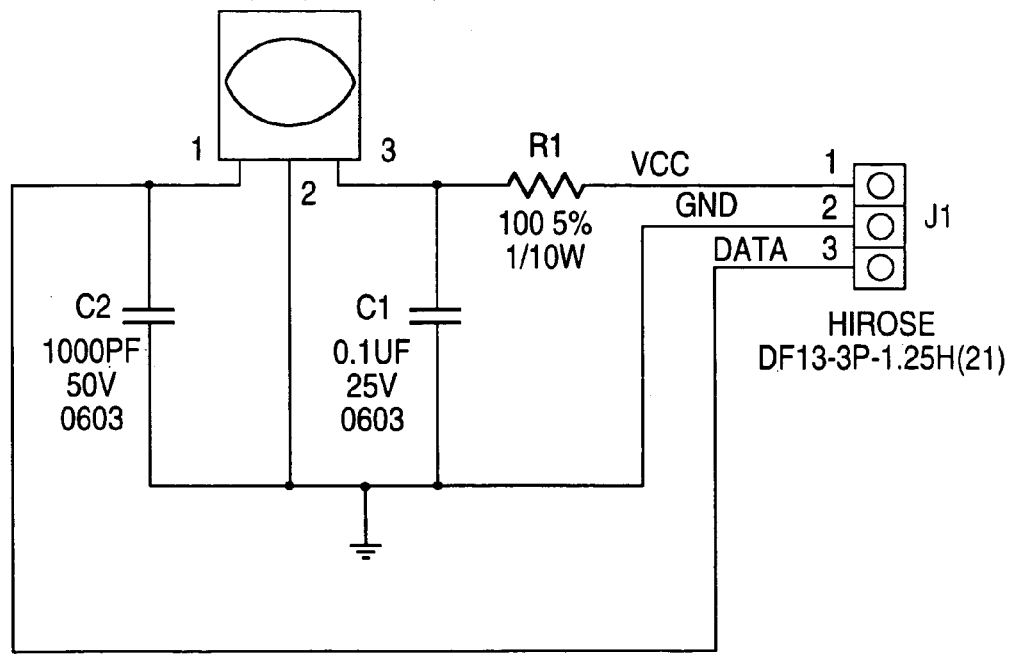
FIG. 22 is an electronic circuit schematic of a sensor receiver unit wired to provide data pulses.

The infrared receiving sensors and infrared transmitter circuits used in the present invention are modifications of well-known infrared controller circuits. A variety of circuits may be used to achieve the function of the present invention. FIG. 22 shows a receiver circuit comprising a Toshiba TPS831 phototransistor receiver. The Toshiba TPS831 is a preferred receiver because of its low cost and because it contains other circuit elements, such as amplifier and control circuits, which enable it to be "plugged in" as. a substantially complete infrared receiver unit. As shown in FIG. 22, a comparatively simple circuit arrangement may be used to collect pulse data from a TPS831 sensor because the TPS831 sensor includes amplifier and control circuits.

A signal arbitration technique is preferably provided to account for the fact that several cursor control inputs are possible in the present invention. Also, the signal arbitration technique preferably reduces the complexity of the firmware in the control circuitry, particularly if clock/data line resources are shared. There are two principal ways that the notebook computer of the present invention may be used. One way that the computer could be used is that only the glide point 70 and detached input module 100 are used. For this case, it is desirable that the firmware in the keyboard controller disable inputs from one of the devices or, alternately, enable both devices so that the movements of the two input devices are summed up and sent as a single movement. Another way that notebook computer 10 may be used is in conjunction with additional input devices attached to an external port.

Figure 23A:
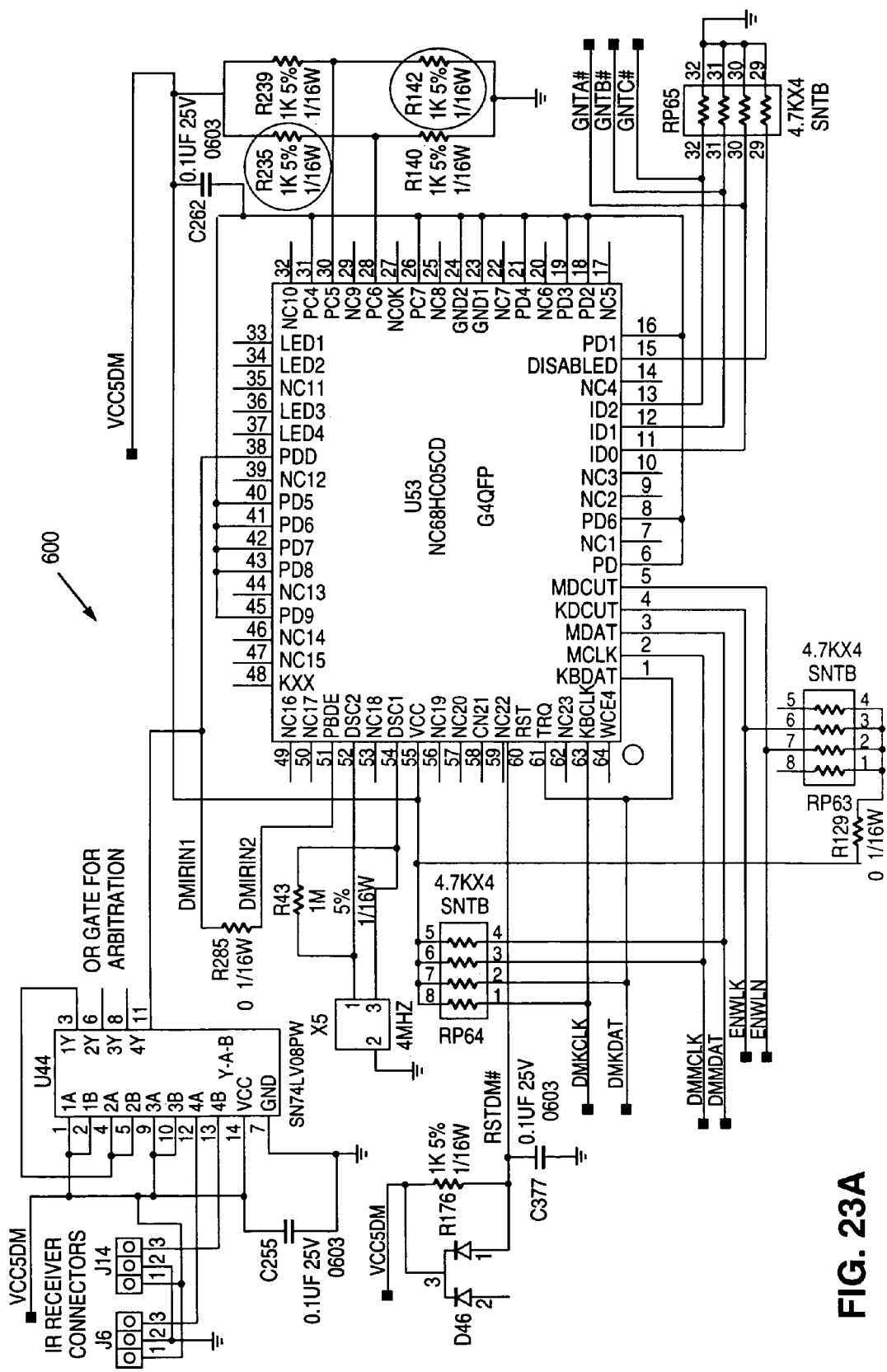
FIG. 23A is a circuit schematic of a portion of the infrared receiver control circuit of the present invention.
Figure 23B:
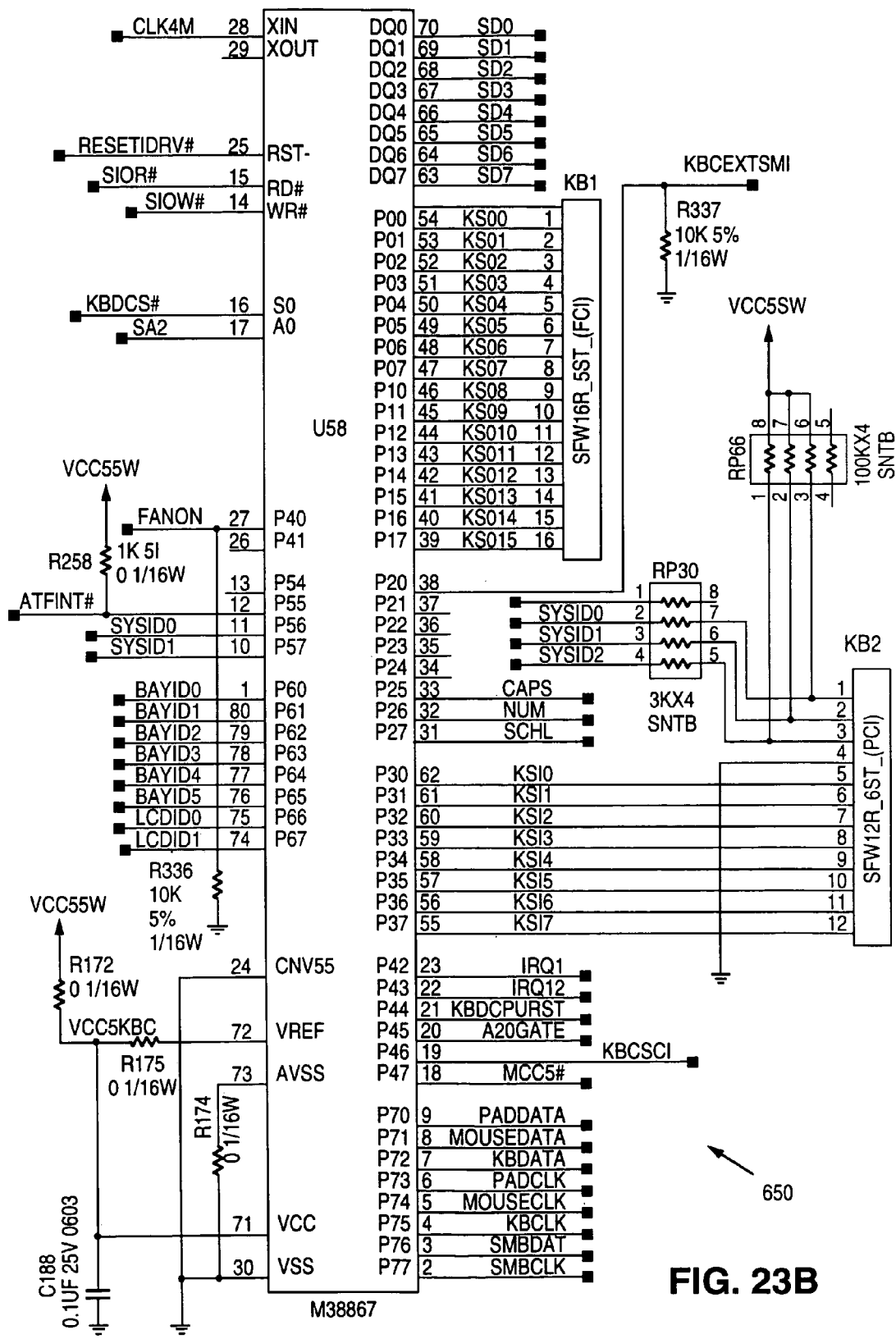
FIG. 23B is a circuit schematic of a portion of the keyboard control circuitry of the present invention.
Figure 23C:
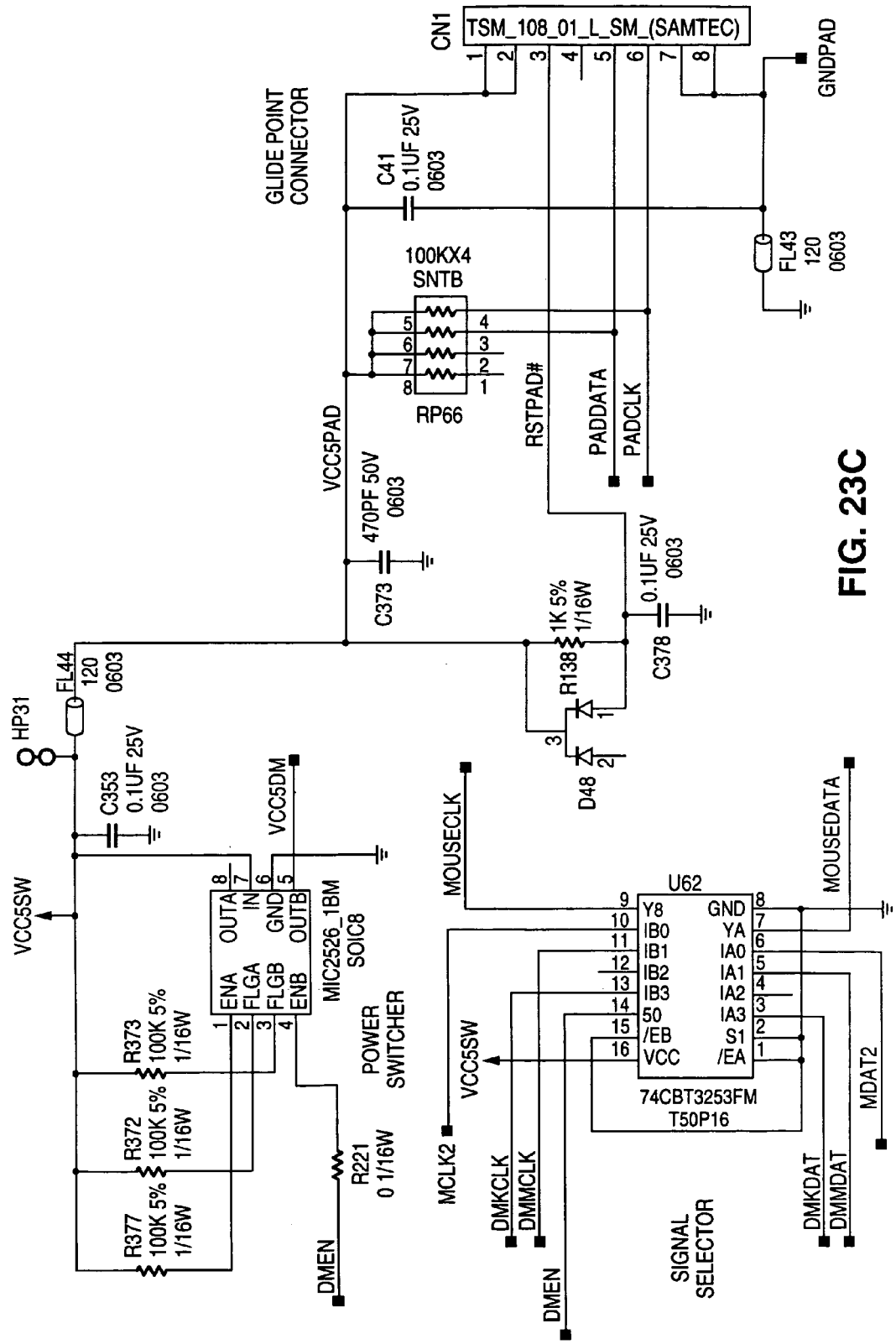
FIG. 23C is a circuit schematic of an enable/disable circuit for the pointing devices of FIGS. 23A and 23B.
Figure 23D:
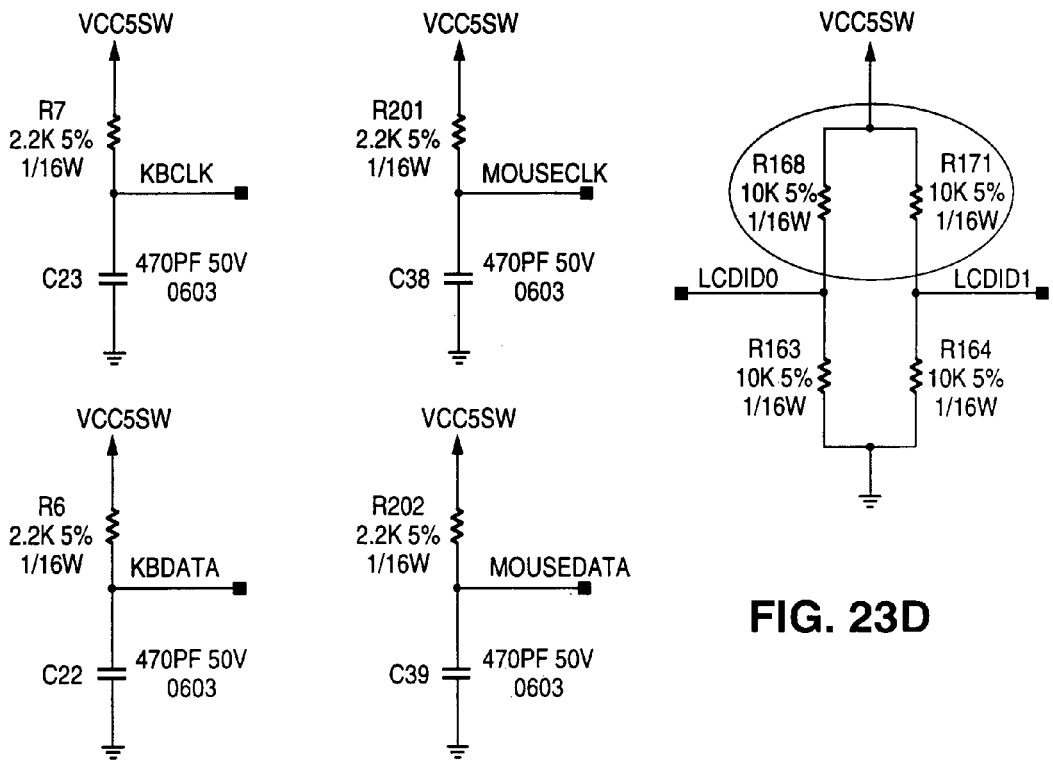
FIG. 23D is a circuit schematic of signal terminations for the receiver and keyboard control circuitry of FIGS. 23A and 23B.
Figure 24:
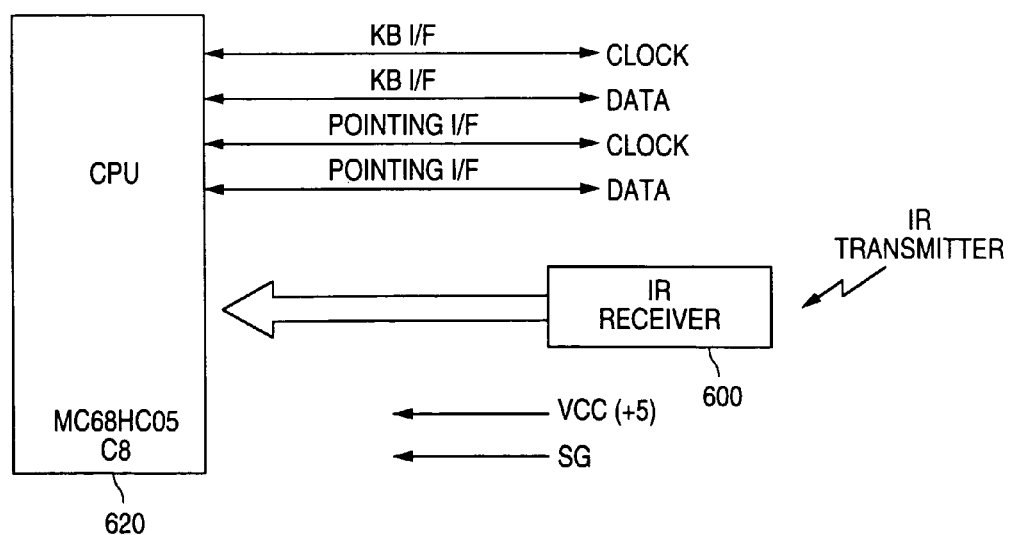
FIG. 24 is an electronic block diagram showing how receiver inputs are sent to a control unit coupled to keyboard inputs.

A variety of receiver designs and signal arbitration circuits are encompassed by the teachings of the present invention. However, FIGS. 23A, 23B, 23C, and 23D show one preferred receiver and signal arbitration circuit which accomplishes a comparatively simple receiver and signal arbitration function. FIG. 23A is a circuit schematic showing a portion of the receiver unit 600 in the notebook computer. A receiver circuit 600 receives input data from two or more sensors which are combined and fed into a receiver control unit. FIG. 23B is a circuit schematic showing a portion of the keyboard controller circuit. FIG. 23C is a circuit schematic showing a portion of circuitry used to enable/disable pointing devices. FIG. 23D is a circuit schematic of circuit terminations of FIGS. 23A and 23B. FIG. 24 is a block diagram showing how the receiver circuit 600 is connected to a microprocessor 620 which is connected to other keyboard I/F clock and data lines connected to keyboard controller electronics 650.

The embodiment of FIGS. 23 and 24 performs a signal arbitration function in which when an external input device is connected to an external port (such as an external PS/2 mouse) both glide point 70 and infrared input device 100 are disabled. This arbitration approach is useful when a limited number of ports are connected to the keyboard controller and the same clock/data lines are used (i.e., multiplexing). However, those of ordinary skill in the art of notebook computer design are familiar with methods to modify the firmware of the control circuitry of FIGS. 23 and 24 to work with multiple ports, which would permit an external input device to be used in conjunction with a glide point 70 and infrared input module 100.

Figure 25:
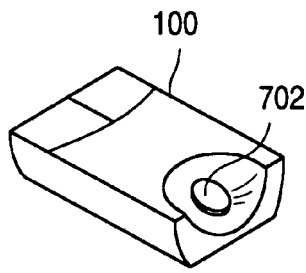
FIG. 25 is a perspective view of a mouse/trackball infrared input module.
Figure 26:
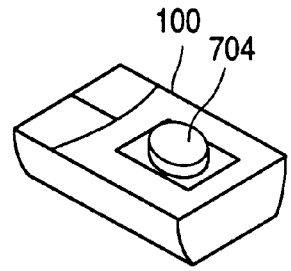
FIG. 26 is a perspective view of a mouse/ergo-track infrared input module.
Figure 27:
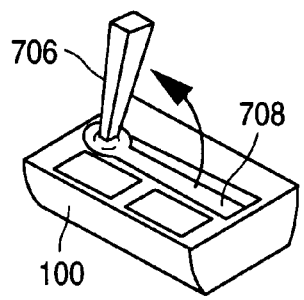
FIG. 27 is a perspective view of a mouse/joystick infrared input module.

As previously described, a preferred embodiment of the inventive infrared input module comprises a mouse and touchpad input devices. However, other input devices besides a touchpad may be used. For example, as shown in FIG. 25, instead of a touchpad a trackball 702 may alternatively be used. Alternately, as shown in FIG. 26, an "ergo track" or "eraser head" type input device 704 input device may be used instead of a touchpad. The ergo track and eraser head input device are common names for input devices comprised of a raised, approximately nickel-sized device which performs a cursor control function in some notebook computers. Other types of input devices may also be incorporated into the present invention. FIG. 27 shows a retractable joystick 706 that may be stowed into a recess 708 on infrared input module 100. The joystick 706 may, for example, be a game joystick to facilitate a user playing a game.

Additionally, other non-cursor related functions may be incorporated into the infrared input device. However, in order to use the infrared input device 100 to input non-cursor related information, the computer must distinguish between cursor control inputs and non-cursor control inputs. One means for the computer to distinguish between cursor control inputs and non-cursor control inputs is for the user to alter a user preference program when the infrared input device is not being used as cursor control device. Another means to facilitate using the infrared input device 100 for other applications is for the infrared input device to transmit mode-control information which instructs the notebook computer 10 how to interpret bytes 510, 515. As previously discussed with reference to FIG. 17, several bits in the first byte 505 may be used as an ID code. However, several bits may also be used in the first byte 505 as mode-control bits to inform the notebook computer that non-cursor related information is being transmitted from the infrared input device in the form of bytes 510, 515. A miniature switch 190 may be included in the infrared input device to permit the user to adjust the mode-bits. For example, two bits devoted to mode-control information would provide the option of ordinary cursor control and three other noncursor input modes.

Figure 28:
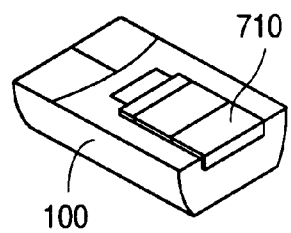
FIG. 28 is a perspective view of a mouse/microphone infrared input module.

One function that increases the potential number of uses of an infrared input device is a mode in which a microphone disposed in the infrared input device is used to establish an audio communications link with notebook computer 10. For example, as shown in FIG. 28, a microphone 710 may be incorporated into infrared input module 100. Circuits to convert voice signals into digital pulses suitable for infrared transmission are well-known in the context of fiber optics.

Conventional, well-known circuits in infrared input module 100 convert voice signals into infrared pulses transmitted notebook computer 10 using well-known principles. Using the infrared input module 100 to transmit audio signals would have many benefits. These include, but are not limited to, using the notebook computer as a public address system, facilitating voice control of the notebook computer during an interactive computer presentation, or facilitating digital voice recording/identification.

Figure 29:
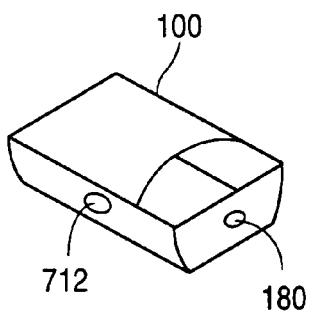
FIG. 29 is a perspective view of a mouse/camera infrared input module.

Another function that increases the functionality of an infrared input device is an optical image transmission link between the infrared input device 100 and the notebook computer 10. For example, a variety of well-known miniature cameras which convert optical images into digital signals could be incorporated into infrared input module 100. As shown in FIG. 29, a miniature camera 712 could be incorporated along a portion of infrared input module 100. This would permit the user many potential applications, such as using the infrared input module 100 to take digital photographs of customers or to make records of documents which could be stored in the notebook computer or electronically transmitted.

Figure 30:
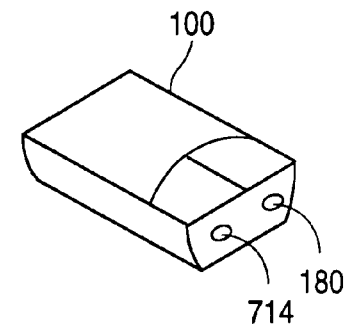
FIG. 30 is a perspective view of a mouse/laser pointer infrared input module.

Another function that increases the functionality of an infrared input device is a laser pointer. As shown in FIG. 30, a laser pointer 714 could be disposed along one side of the infrared input module 100. A miniature switch 190 could be used to turn on/off the laser pointer. A laser pointer could be used, for example, to facilitate an interactive sales presentation in which the salesperson pointed at various parts of the screen.

Figure 31:
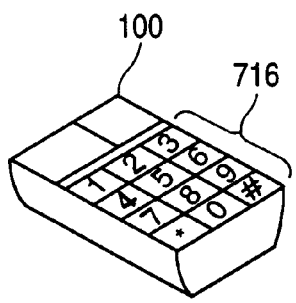
FIG. 31 is a perspective view of a mouse/numeric input pad infrared input module.

Still other functions could be included in the infrared input device. For example, a numeric input pad could be included on the top surface of the infrared input device. For example silk screen pads or a compact elastomer key pad could be included. As shown in FIG. 31, a numeric input pad 716 included on infrared input device 100 would permit a user to input numbers, such as telephone numbers or code/macro numbers.

Figure 32:
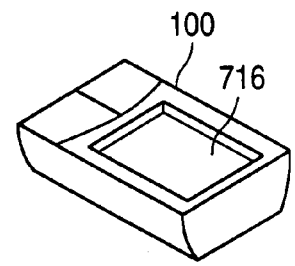
FIG. 32 is a perspective view of a mouse/finger print identification infrared input module.

A wide variety of electronic sensor and control devices may be incorporated into the infrared input module as long as the device is compact and its outputs can be converted into a digital format which can be transmitted by the infrared transmitter of the infrared input device. For example, as shown in FIG. 32, a finger print recognition device 718 could be disposed on a surface of infrared input module 100. For example, a finger print recognition device 718 comprised of a charge coupled device (CCD) array could be used to scan a user's fingerprint and the resulting data digitally transmitted back to the notebook computer.

Generally, adding additional cursor control devices and/or additional data input devices to a detachable mouse facilitates using a notebook computer in new ways. For example a infrared input module 100 with a mouse function, touchpad, laser pointer, and microphone would permit a salesperson to use a notebook computer in a variety of new ways to enhance sales presentations.

In summary, the inventive notebook computer comprises a detachable auxiliary detachable infrared input unit and a notebook computer sensor design. The number, spacing, and orientation of infrared sensors disposed on the notebook computer is preferably selected to achieve a notebook computer with a wide angle infrared sensor response. The inventive detachable infrared input unit preferably utilizes an energy efficient design which 1) permits the user to adjust the infrared power to select a transmitter power setting which is sufficient for a particular application without being excessively wasteful; 2) utilizes a pulse-data transmission scheme which requires no infrared transmitter power during quiescent periods; and 3) utilizes a control circuit which operates the rotary encoder lamps of the mouse in a low average-power polling mode during quiescent periods. The inventive notebook computer preferably includes a user programmable ID code to prevent cross-talk problems with other infrared input devices. The inventive detachable input unit is also sized and shaped to facilitate a user comfortably using the unit as either a mouse or a palm-held touchpad. The inventive auxiliary input unit and notebook computer is also preferably designed to permit the user to use the auxiliary input unit either alone or in combination with a conventional input unit permanently attached to the notebook computer. The combination of the above-described features greatly increases the potential functionality of an infrared mouse and significantly improves battery lifetime. In particular, the inventive notebook computer and detachable input unit facilitate new uses of a notebook computer, such as a salesperson using the notebook computer during presentations.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. An input device for a computer, comprising:
   a housing;
   a rotatable ball coupled to said housing;
   an optical encoder comprising photo-interruptors disposed in said housing, said optical encoder providing output signals in response to rotation of said ball;
   a control circuit, said control circuit receiving as inputs said output signals of said optical encoder, said control circuit also capable of controlling the power to said photo-interruptors of said optical encoder;
   wherein said control circuit conserves power by operating said optical encoder in a periodic-pulsed mode when said ball is at rest longer than a preselected time interval and said control circuit utilizes said signals of said encoder in said periodic-pulsed mode to determine when to resume a continuous position sensing encoder mode;
   an infrared transmitter to transmit data corresponding to the output signals of said optical encoder;
   wherein the infrared transmitter transmits the data as bytes with a start bit; and wherein no infrared data are transmitted when said ball is in said power conservation state; and
   a user settable identification code.

2. An input device for a computer, comprising:
   a housing;
   a rotatable ball coupled to said housing;
   an optical encoder comprising photo-interruptors disposed in said housing, said optical encoder providing output signals in response to rotation of said ball;
   a control circuit, said control circuit receiving as inputs said output signals of said optical encoder, said control circuit also capable of controlling the power to said photo-interruptors of said optical encoder;
   wherein said control circuit conserves power by operating said optical encoder in a periodic-pulsed mode when said ball is at rest longer than a preselected time interval and said control circuit utilizes said signals of said encoder in said periodic-pulsed mode to determine when to resume a continuous position sensing encoder mode;

a wireless transmitter for transmittings the data corresponding to the output of said optical encorder;

wherein said wireless transmitter transmits the data as bytes with a start bit; and wherein no data are transmitted when said ball is in said power conservation state; and a user settable identification code.

* * * * *

UNITED STATES PATENT AND TRADEMARK OFFICE
CERTIFICATE OF CORRECTION

PATENT NO. : 7,298,359 B2 Page 1 of 1
APPLICATION NO. : 09/894568
DATED : November 20, 2007
INVENTOR(S) : Darren Kim et al.

It is certified that error appears in the above-identified patent and that said Letters Patent is hereby corrected as shown below:

Column 21, Line 6, Claim 2, after "for" delete "transmittings the" and insert
-- transmitting --.

Signed and Sealed this

Thirtieth Day of December, 2008

JON W. DUDAS
*Director of the United States Patent and Trademark Office*